United States Patent
Djuhera et al.

(10) Patent No.: US 12,273,278 B2
(45) Date of Patent: Apr. 8, 2025

(54) ORCHESTRATION OF WORKLOADS INVOLVING AN AI MODEL

(71) Applicant: INTERNATIONAL BUSINESS MACHINES CORPORATION, Armonk, NY (US)

(72) Inventors: Aladin Djuhera, Dachau (DE); Alecio Pedro Delazari Binotto, Munich (DE); Fernando Luiz Koch, Palm Beach Gardens, FL (US); Rob High, Round Rock, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 18/483,849

(22) Filed: Oct. 10, 2023

(65) Prior Publication Data
US 2025/0071069 A1    Feb. 27, 2025

(51) Int. Cl.
*H04L 47/70* (2022.01)
*H04L 41/16* (2022.01)
*H04L 47/80* (2022.01)

(52) U.S. Cl.
CPC .......... *H04L 47/822* (2013.01); *H04L 41/16* (2013.01); *H04L 47/803* (2013.01)

(58) Field of Classification Search
CPC ...... H04L 47/822; H04L 47/803; H04L 41/16
See application file for complete search history.

(56) References Cited

U.S. PATENT DOCUMENTS

| | | | |
|---|---|---|---|
| 10,856,360 B1 | 12/2020 | Sun | |
| 11,423,254 B2* | 8/2022 | Prakash | .................. G06F 9/505 |
| 2019/0318240 A1* | 10/2019 | Kulkarni | .................. G06N 3/08 |
| 2020/0311559 A1 | 10/2020 | Chattopadhyay | |
| 2021/0295158 A1 | 9/2021 | Jakubiuk | |
| 2021/0382754 A1* | 12/2021 | Nimmagadda | ....... G06F 9/5016 |

(Continued)

FOREIGN PATENT DOCUMENTS

| | | |
|---|---|---|
| WO | 2021004478 A1 | 1/2021 |
| WO | 2022211981 W | 10/2022 |

OTHER PUBLICATIONS

UK Search Report, Application No. GB231278 I .4, Mailing Date: Feb. 21, 2024, 3 pages.

(Continued)

*Primary Examiner* — Rachel J Hackenberg
(74) *Attorney, Agent, or Firm* — Steven M. Bouknight

(57) ABSTRACT

The present disclosure relates to a method comprising receiving a request to execute a workload using an artificial intelligence model. A current resource utilization status in the distributed system may be determined. The current resource utilization status may be used to define a deployment configuration of the artificial intelligence model, wherein the deployment configuration is defined by: a number and structure of input blocks, a number and structure of output blocks and the intermediate block of the artificial intelligence model, a second computer system to execute the intermediate block, and one or more first computer systems to execute the input and output blocks. The artificial intelligence model may be deployed in accordance with the defined deployment configuration and the workload may be executed.

15 Claims, 10 Drawing Sheets

(56) References Cited

U.S. PATENT DOCUMENTS

| | | | |
|---|---|---|---|
| 2022/0012607 A1* | 1/2022 | Liu | G06F 9/5044 |
| 2022/0108177 A1 | 4/2022 | Samek | |
| 2022/0121455 A1* | 4/2022 | Hoban | H04L 63/083 |
| 2022/0124009 A1* | 4/2022 | Metsch | H04L 63/1433 |
| 2023/0177345 A1* | 6/2023 | Vilcu | G06N 3/044 |
| | | | 706/21 |

OTHER PUBLICATIONS

Djuhera et al., "Orchestration of Workloads Involving an AI Model", GB application No. GB2312781.4, Filing Date: Aug. 22, 2023, 54 pages.

Disclosed Anonymously, "Methods and System for Secure and Optimal DL Split Model Deployment at Heterogeneous Edge Environment", An IP.com Prior Art Database Technical Disclosure, IP.com No. IPCOM000267162D, IP.com Electronic Publication Date: Sep. 30, 2021, 9 pages.

Hou et al., "DistrEdge: Speeding up Convolutional Neural Network Inference on Distributed Edge Devices", arXiv:2202.01699v2, Feb. 8, 2022, 12 pages.

Karjee et al., "Split computing: DNN inference partition with load balancing in IoT-edge platform for beyond 5G", ScienceDirect, Measurement: Sensors, vol. 23, Oct. 2022, 65 pages.

Kim et al., "A Bargaining Game for Personalized, Energy Efficient Split Learning over Wireless Networks", arXiv:2212.06107v1, Dec. 12, 2022, 6 pages.

Mohammed et al., "Distributed Inference Acceleration with Adaptive DNN Partitioning and Offloading", IEEE Infocom 2020—IEEE Conference on Computer Communications, Published Date: Jul. 6, 2020, 10 pages.

Prasad et al., "A Joint Model Provisioning and Request Dispatch Solution for Low-Latency Inference Services on Edge", MDPI, Sensors 2021, vol. 21, pp. 1-17.

Tuli et al., "SplitPlace: AI Augmented Splitting and Placement of Large-Scale Neural Networks in Mobile Edge Environments", IEEE Transactions on Mobile Computing, A preliminary version of this work was presented at the Student Research Competition in ACM SIGMETRICS Conference 2021, arXiv:2205.10635v1, May 21, 2022, pp. 1-21.

Zeng et al., "CoEdge: Cooperative DNN Inference with Adaptive Workload Partitioning over Heterogeneous Edge Devices", arXiv:2012.03257v1, Dec. 6, 2020, 14 pages.

International Searching Authority, "Notification of Transmittal of the International Search Report and the Written Opinion of the International Searching Authority, or Declaration," Patent Cooperation Treaty, Nov. 28, 2024, 12 pages, International Application No. PCT/EP2024/072231.

Li et al. "Partitioning Multi-Layer Edge Network for Neural Network Collaborative Computing", EURASIP Journal on Wireless Communications and Networking, Aug. 19, 2023, pp. 1-51, URL:https://jwcn-eurasipjournals.springeropen.com/articles/10.1186/s13638-023-02284-X.

* cited by examiner

ORCHESTRATION OF WORKLOADS INVOLVING AN AI MODEL

BACKGROUND

The present invention relates to the field of digital computer systems, and more specifically, to a method for executing workloads in a distributed system.

A radio access network (RAN) may provide access to and coordinate the management of resources across sites of a mobile telecommunication system in accordance with a protocol stack. The radio access network may provide processing resources which may, for example, be used to infer artificial intelligence (AI) models. However, there is a need to introduce security for inference using AI models which need to be processed efficiently on constrained computing environments.

SUMMARY

Various embodiments provide a method for executing workloads in a distributed system, computer program product and system as described by the subject matter of the independent claims. Advantageous embodiments are described in the dependent claims. Embodiments of the present invention can be freely combined with each other if they are not mutually exclusive.

In one aspect, the invention relates to a method for executing workloads in a distributed system using an artificial intelligence model, the distributed system comprising a set of first computer systems which are configured to connect to at least one second computer system of the distributed system, the artificial intelligence model being configured to receive a specific input, process the specific input and provide a specific output, the artificial intelligence model being configured to be split into a set of one or more input blocks, an intermediate block and a set of one or more output blocks, such that the set of one or more input blocks receive the specific input and provides an intermediate output, the intermediate block receives as input the intermediate output and provides another intermediate output, and the set of one or more output blocks receive as input the other intermediate output and provides said specific output. The method comprises an orchestration method comprising: receiving a request to execute a workload using the artificial intelligence model, the workload comprising receiving the specific input; determining a current resource utilization status in the distributed system; using the current resource utilization status to define a deployment configuration of the artificial intelligence model, wherein the deployment configuration is defined by: a number and structure of input blocks, a number and structure of output blocks and the intermediate block of the artificial intelligence model, a second computer system to execute the intermediate block, and one or more first computer systems to execute the input and output blocks; deploying the artificial intelligence model in accordance with the defined deployment configuration and executing the workload.

In one aspect the invention relates to a computer program product comprising a computer-readable storage medium having computer-readable program code embodied therewith, the computer-readable program code configured to implement the method of the above embodiment.

In one aspect the invention relates to a computer system for executing workloads in a distributed system using an artificial intelligence model, the distributed system comprising a set of first computer systems which are configured to connect to at least one second computer system of the distributed system, the artificial intelligence model being configured to receive a specific input, process the specific input and provide a specific output, the artificial intelligence model being configured to be split into a set of one or more input blocks, an intermediate block and a set of one or more output blocks, such that the set of one or more input blocks receive the specific input and provides an intermediate output, the intermediate block receives as input the intermediate output and provides another intermediate output, and the set of one or more output blocks receive as input the other intermediate output and provides said specific output. The computer system is configured for: receiving a request to execute a workload using the artificial intelligence model, the workload comprising receiving the specific input; determining a current resource utilization status in the distributed system; using the current resource utilization status to define a deployment configuration of the artificial intelligence model, wherein the deployment configuration is defined by: a number and structure of input blocks, a number and structure of output blocks and the intermediate block of the artificial intelligence model, a second computer system to execute the intermediate block, and one or more first computer systems to execute the input and output blocks; deploying the artificial intelligence model in accordance with the defined deployment configuration and executing the workload.

BRIEF DESCRIPTION OF THE DRAWINGS

In the following embodiments of the invention are explained in greater detail, by way of example only, making reference to the drawings in which.

DETAILED DESCRIPTION

Figure 1:
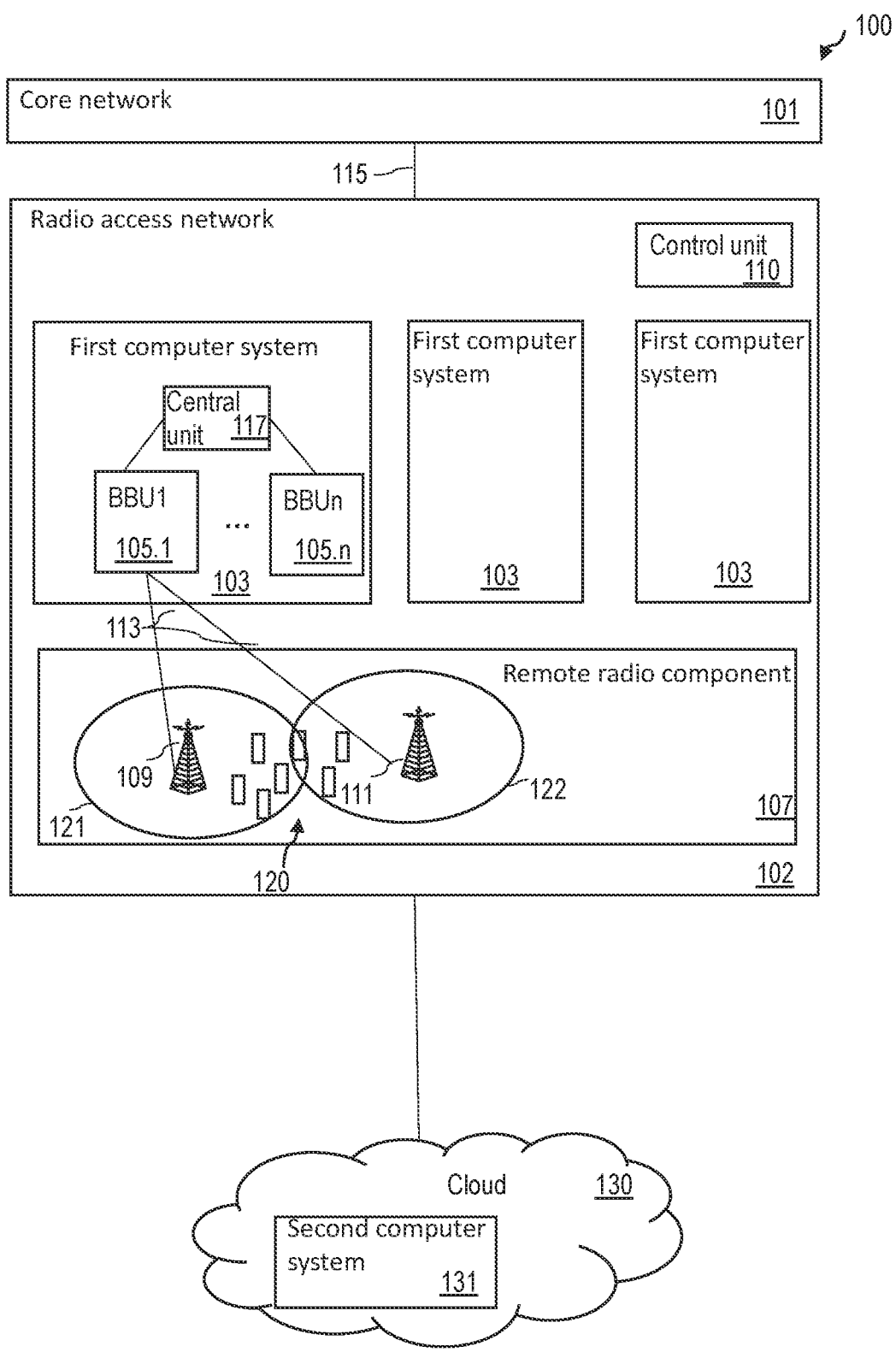
FIG. 1 is a block diagram of a wireless communication system in accordance with an example of the present subject matter.

The descriptions of the various embodiments of the present invention will be presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The artificial intelligence model may be configured to perform a task. The task may refer to a type of prediction or inference being made. The task may be based on the problem or question that is being asked, and the available data. The task may, for example, be a classification task, clustering task or a prediction task. For example, the classification task assigns data to categories, and the clustering task groups data according to similarity. The artificial intelligence model may perform the task by receiving input data, processing the input data using a set of learnable parameters and providing an output that represents the result of the task. The artificial intelligence model may be provided as deep neural network, transformer or another artificial intelligence model that can be split into blocks as described herein.

The artificial intelligence model may be configured to receive an input X and provide an output Y. The splitting of the artificial intelligence model may be performed into any number of blocks provided that if the same input X is used as input to the split model, the same output Y may be obtained.

The splitting of the artificial intelligence model may be performed to obtain at least three blocks S1, S2 and S3, where S1 is the input block, S2 is the intermediate block and S3 is the output block. In one example, the number of blocks may be increased by splitting the input block S1 into n1 input sub-blocks S1(a), S1(b) . . . . S1(n1) and splitting the output block S3 into n2 output sub-blocks S3(a), S3(b) . . . S3(n2) where n1 and n2 are higher than or equal to two. This may result in a number of blocks equal to n1+n2+1. In the following and for simplification of the description, each of the input sub-blocks S1(a), S1(b) . . . . S1(n1) may be referred to as input block. Similarly, each of the output sub-blocks S1(a), S1(b) . . . . S1(n1) may be referred to as output block. That is, the artificial intelligence model may be split into one or more input blocks, one or more output blocks and one intermediate block.

The splitting of the of the artificial intelligence model may result in a number of blocks having their respective structure. The structure of the block may, for example, refer to the type of input and output of the block and the number and type of operations performed by the block e.g., if the artificial intelligence model is a deep neural network, the structure of the block may be defined by the number of layers that belong to the block, wherein the number of layers may represent a specific number and type of operations performed by the model.

The execution of the artificial intelligence model may be performed in accordance with an execution pipeline. The execution pipeline may comprise three or more sequential execution stages, wherein each execution stage is configured to receive an input, process the input using a subset of the learnable parameters and provide an output. The input of one execution stage, which is not the first execution stage, may be the output of the preceding execution stage. For example, the input block S1 may represent one or more first execution stages of the pipeline, the output block S3 may represent one or more last execution stages of the pipeline and the intermediate block S2 may represent the remaining execution stages. For example, in case of a deep neural network an execution stage may represent the processing of one or more layers of the deep neural network. The processing performed for one network layer may, for example, comprise weighting operation, convolution operations or activation operations etc. The AI model may be split at two cut layers, and the intermediate output may, for example, comprise cut layer activations. In general, the present model splitting may be applied for various AI architectures such as CNNs or other AI architectures such as Transformers, Resnet, LSTM or an AI model that can be executed in accordance with an execution pipeline as described above.

Different workloads may use the artificial intelligence model to perform the task assigned to the artificial intelligence model. The workload may refer to one or more software applications and data accessed by the one or more software applications. For example, the workload may comprise multiple steps wherein one or more steps may comprise the step of inputting input data to the artificial intelligence model in order to obtain the output associated with the input data. The output may further be used by other steps of the workflow e.g., if the artificial intelligence model is trained to predict whether a communication channel is reliable or not, a workflow for data scheduling may use the artificial intelligence model to find the reliable channels in order to schedule communication on them. In another example, the AI model may be trained for facial recognition of users, wherein the result of the recognition may be used to enable service access to the users.

These workloads may efficiently be executed in accordance with the present subject matter using the distributed system. The distributed system comprises the multiple first computer systems which are remotely connected to the one or more second computer systems. The first computer system may be a local computer system e.g., accessible to users. The second computer system may not be part of the first computer system. The second computer system is remote from the first computer system. The first computer system may be configured to connect to the second computer system by any form or medium of wireline and/or wireless digital data communication, e.g., a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN), all or a portion of the Internet, any other communication system or systems at one or more locations or a combination thereof.

The artificial intelligence model may be deployed using a given deployment configuration. The deployment configuration may be defined by at least one of: the number and structure of blocks of the artificial intelligence model, a second computer system to execute the intermediate block, and the one or more first computer systems to execute the input and output blocks of the artificial intelligence model. For example, in case the artificial intelligence model is split into three blocks S1, S2 and S3, the one or more first computer systems may process the input and output blocks S1 and S3. In case the artificial intelligence model is split into a higher number (e.g., n1+n2+1 blocks) of blocks S1(a), S1(b) . . . . S1(n1), S2, S3(a), S3(b) . . . and S3(n2), the one or more first computer systems may process the n1+n2 input and output blocks S1(a), S1(b) . . . . S1(n1), S3(a), S3(b) . . . and S3(n2).

The deployment configuration may, for example, be defined by a set of three entries [{Blocks}$_i$, {CS1}$_i$, {CS2}$_i$], where the first entry {Blocks}$_i$ refers to the blocks forming the artificial intelligence model, the second entry {CS1}$_i$ refers to the set of one or more first computer systems and the respective blocks which are (or to be) deployed on them and the third entry $\{CS2\}_i$ refers to the second computer system in which the intermediate block is (or to be) deployed. The subscript i refers to the time at which the deployment configuration is defined and used. For example, the initial deployment configuration may be defined by the set of entries [$\{Blocks\}_0$, $\{CS1\}_0$, $\{CS2\}_0$], the immediately following deployment configuration may be defined by the set of entries [$\{Blocks\}_1$, $\{CS1\}_1$, $\{CS2\}_1$], and so forth.

Deploying the artificial intelligence model in accordance with the defined deployment configuration [$\{Blocks\}_i$, $\{CS1\}_i$, $\{CS2\}_i$] may comprise splitting (if it is not already split accordingly) the artificial intelligence model to obtain the blocks as defined by the entry $\{Blocks\}_i$, deploying the intermediate block in the second computer system $\{CS2\}_i$, and deploying the input and output blocks in the set of first computer systems as described in the entry $\{CS1\}_i$.

Thus, the present subject matter may provide an accurate method for an optimal execution of workflows using available resources. By contrast to existing techniques, the present subject matter may not only search for the resources to execute a program but it also adapts the structure of the program itself in order to find the optimal combination of resources. The present example may find a trade-off between the secure execution of the artificial intelligence model and the available processing resources. The execution may be secure because the input and output of the AI model are processed locally at the first computer system(s). This may prevent issues such as model inversion attacks by malicious parties as well as reverse engineering attempts of sensitive input data and/or output labels by either malicious parties and/or honest-but-curious servers e.g., in the cloud.

The present subject matter may provide advantageous techniques for defining the deployment configuration using the current resource utilization status. The definition of the deployment configuration may further be based on an estimate of required resources by each processing stage or processing step of the AI model. The resources required by each block of the AI model may be referred to as required block resources.

In one configuration definition example, the defined deployment configuration may be the initial deployment configuration, meaning that a deployment configuration of the AI model has not been defined or used before. In this case, every entry of the set of entries [$\{Blocks\}_i$, $\{CS1\}_i$, $\{CS2\}_i$] may have to be defined. That is, the AI model may be split into blocks, and the first and second computer systems to deploy it may be selected.

In one configuration definition example, the defined deployment configuration is not the initial deployment configuration because the AI model is previously deployed and used in accordance with an existing deployment configuration. In this case, there are alternatives to define the deployment configuration. In one example, the deployment configuration may be defined using the resource utilization status and without using the existing deployment configuration. That is, the AI model may be split into blocks, and the first and second computer systems to deploy it may be selected. Alternatively, the deployment configuration may be defined using the resource utilization status and further using the existing deployment configuration. For example, the deployment configuration [$\{Blocks\}_i$, $\{CS1\}_i$, $\{CS2\}_i$] may be defined using the current resource utilization status of the distributed system and the existing deployment configuration [$\{Blocks\}_{i-1}$, $\{CS1\}_{i-1}$, $\{CS2\}_{i-1}$]. For the definition of the deployment configuration, one or more entries of the existing deployment configuration [$\{Blocks\}_{i-1}$, $\{CS1\}_{i-1}$, $\{CS2\}_{i-1}$] may be changed e.g., the new deployment configuration may have the same number and structure of blocks as the existing deployment configuration but different deployment systems: [$\{Blocks\}_i=\{Blocks\}_{i-1}$, $\{CS1\}_i\neq\{CS1\}_{i-1}$, $\{CS2\}_i\neq\{CS2\}_{i-1}$], where the sign $\neq$ refers to the difference. Alternatively, the new deployment configuration may be provided as function of the existing deployment configuration as follows:

[$\{Blocks\}_i=\{Blocks\}_{i-1}$, $\{CS1\}_i=\{CS1\}_{i-1}$, $\{CS2\}_i\neq\{CS2\}_{i-1}$],

[$\{Blocks\}_i\neq\{Blocks\}_{i-1}$, $\{CS1\}_i\neq\{CS1\}_{i-1}$, $\{CS2\}_i=\{CS2\}_{i-1}$],

[$\{Blocks\}_i\neq\{Blocks\}_{i-1}$, $\{CS1\}_i\neq\{CS1\}_{i-1}$, $\{CS2\}_i\neq\{CS2\}_{i-1}$],

[$\{Blocks\}_i\neq\{Blocks\}_{i-1}$, $\{CS1\}_i=\{CS1\}_{i-1}$, $\{CS2\}_i\neq\{CS2\}_{i-1}$],

[$\{Blocks\}_i\neq\{Blocks\}_{i-1}$, $\{CS1\}_i\neq\{CS1\}_{i-1}$, $\{CS2\}_i=\{CS2\}_{i-1}$], or

[$\{Blocks\}_i=\{Blocks\}_{i-1}$, $\{CS1\}_i=\{CS1\}_{i-1}$, $\{CS2\}_i=\{CS2\}_{i-1}$]. The last defined deployment configuration option indicates that the existing deployment configuration is maintained. This may be the case if the current resource utilization status indicates that the existing deployment configuration is still valid and can further be used.

In one configuration definition example, the definition of the deployment configuration may comprise a first step of initializing the set of blocks to an initial set of blocks. The initial set of blocks may be the last used set of blocks in case of an update of the existing deployment configuration. In case the deployment configuration is a very first configuration, the initial set of blocks may be (roughly) defined e.g., the initial set of blocks may randomly be defined. Following the above notation, the definition of the deployment configuration [$\{Blocks\}_i$, $\{CS1\}_i$, $\{CS2\}_i$] may start by initializing the set of blocks $\{Blocks\}_i$ to the previous set of blocks $\{Blocks\}_{i-1}$, if i>0; otherwise, the set of blocks $\{Blocks\}_i$ may be initialized to a roughly determined set of blocks $\{Blocks\}_{-1}$. After this initialization, alternative techniques may be used to find the deployment configuration [$\{Blocks\}_i$, $\{CS1\}_i$, $\{CS2\}_i$]. In one example, the first computer systems and the second computer system that can execute the initial set of blocks may be selected. Alternatively, the first computer systems and the second computer system may first be defined and in case the initial set of blocks cannot be deployed on the defined systems, the set of blocks may be changed. Alternatively, the initial set of blocks may be updated and the existing first computer systems and the second computer system may be maintained if they can execute the updated set of blocks otherwise a new configuration of the computer systems may be determined. Alternatively, the initial set of blocks may be updated and a new configuration of the first computer systems and the second computer system may be determined.

In one configuration definition example, the current resource utilization status may be determined by evaluating a set of resource parameters. The set of resource parameters may, for example, comprise the hardware specification of each of the first computer systems e.g., the resource parameter may be provided as a data structure e.g., vector, wherein each entry comprises the hardware specification of the respective first computer system. The set of resource parameters may, for example, comprise the computation situation of each computer system. The set of resource parameters may, for example, comprise the link reliability in the distributed system. The set of resource parameters may, for example, comprise the latency in the distributed system. The set of resource parameters may, for example, comprise the data transfer speeds in the distributed system. The deployment configuration may be defined by using one or more rules, wherein each rule may map specific set of resource parameters to a deployment configuration. E.g., if the utilization level of a first computer system CS1_0 is smaller than 10% and the second computer system belongs to a private cloud, then the deployment configuration may be defined as a set of three blocks S1, S2 and S3, where the required block resources of the input and output blocks S1 and S3 can be provided by the first computer system CS1_0, and the required block resources of the main block S2 can be provided by the second computer system. In one example, the rules may be provided using a reinforcement learning. The actions of the reinforcement learning may determine the deployment configuration based on the set of resource parameters and the resources required by the AI model.

Each of the above-described configuration definition examples may result in one or more candidate deployment configurations that fulfil the current resource utilization status. In one example, the deployment configuration may be defined by randomly selecting one of the candidate deployment configurations. Alternatively, a performance analysis of the candidate deployment configurations may be performed, the candidate deployment configurations may be ranked based on their performance and the deployment configuration may be selected based on the ranking e.g., the highest ranked candidate deployment configuration may be the deployment configuration to be used for deploying the AI model. Alternatively, a voting system and/or A/B testing may be used to select one of the candidate deployment configurations.

In one example, the processing resources required by each block of the blocks of the artificial intelligence model may be estimated. The current resource utilization status of the distributed system may be used to identify the first and second computer systems that can run the blocks given the estimated processing resources.

According to one example, before executing the orchestration method, the method comprises deploying the artificial intelligence model in accordance with an initial deployment configuration, wherein defining the deployment configuration comprises updating the initial deployment configuration. The updating comprises at least one of: resplitting the artificial intelligence model; adding one or more first computer systems to execute the input and output blocks; removing one or more of the initial first computer systems to execute the input and output blocks; or selecting another second computer system to execute the intermediate block.

According to one example, using the current resource utilization status to define the deployment configuration comprises: performing a capacity profiling of the first and second computer systems to determine whether each of the first and second computer systems can execute one or more blocks of the artificial intelligence model; and defining the deployment configuration based on the capacity profiling.

According to one example, the current resource utilization status is defined by at least one of: utilization level of network resources of the distributed system; utilization level of resources of the first computer systems; utilization level of resources of the second computer systems; or resources in each of the first and second computer systems.

According to one example, the deployment configuration is defined further using a rule. The rule requires at least one of: a maximum number of first computer systems to be used for deploying the input and output blocks of the AI model; or a maximum number of blocks of the artificial intelligence model. Each of the above-described configuration definition examples may use the rule for the definition of the deployment configuration.

According to one example, the distributed system is a wireless communication system, wherein the first computer systems are multi-access edge computing (MEC) nodes and the second computer system is a cloud system. The second computer system may be part of a public cloud, or private cloud or a hybrid cloud. For example, multiple public clouds, private clouds and hybrid clouds may be provided, wherein each of the clouds may provide resources for a second computer system (e.g., the cloud may provide the second computer system as a virtual machine). For example, for the definition of the deployment configuration, a specific cloud may first be selected and then the second computer system provided by the selected cloud may be used for the deployment configuration. The multiple clouds may be provided by a same cloud service provider or by different cloud service providers.

According to one example, the method further comprises: executing the deployment of the artificial intelligence model by a broadcaster of the distributed system, sending by the broadcaster an information to an orchestrator of the distributed system, such that the orchestrator triggers the execution of the workload upon receiving the information.

According to one example, the artificial intelligence model may be provided as a neural network (e.g., deep neural network), a transformer or any other artificial intelligence model and corresponding architecture (e.g., in terms of parallelization, distribution) that can be split into blocks as described in the method herein. The input block may represent first network layers, the intermediate block may represent middle network layers; and the output block may represent last network layers.

According to one example, the workload involves at least one of: data analytics, sensor measurement fusion from different sources, image analysis or processing data streams destined to a cloud.

The artificial intelligence model may be split using different techniques. In one first splitting example, the splitting of the artificial intelligence model may comprise the step of determining or identifying the execution pipeline. In one example, the execution pipeline may be provided in association with the artificial intelligence model e.g., execution pipeline may be predefined in a metadata file in association with the artificial intelligence model. In this case, the metadata file may be read in order to extract the execution pipeline. Alternatively, the execution pipeline may be automatically determined using (e.g., parsing and interpreting) the code that implements the artificial intelligence model. In this first splitting example, the splitting may further comprise the step of assigning the execution stages of the determined execution pipeline to a desired number of blocks (e.g., three blocks S1, S2 and S3 or more) of the AI model. In one example, the assignment may be done by randomly assigning execution stages to respective blocks. This may be advantageous in case the first computer system(s) and the second computer system of the deployment configuration are not yet selected. In another example, the assignment may be performed based on available resources in the first computer system(s) and the second computer system of the deployment configuration and based on resources required for the executions stages of the pipeline. For example, the metadata file may further comprise an estimation of processing resources required by each execution stage of the pipeline. Alternatively, the processing resources required by each execution stage may be estimated using, for example, the number of code lines and types of commands used in each execution stage.

In one second splitting example, the splitting of the artificial intelligence model may comprise splitting the code that executes the artificial intelligence model into the desired three or more blocks based on the programming language being used. This may be performed by parsing and interpreting the code. The number of code lines and types of commands may indicate the resources required by each block.

In one third splitting example, a reinforcement learning where a set of states, actions and rewards are defined and learned in a (deep) neural network to achieve rules to find the best splitting policies of the AI model with respect to the current first and second computer systems.

The execution of the workflow comprises executing the AI model one or more times. The execution of the AI model may comprise providing an input of the AI model and receiving an output of the AI model. According to one example, the executing of the AI model comprises: for each two consecutive blocks of the AI model which are deployed on different systems: encoding using an encoding protocol the output of the first block of the two blocks, and sending the encoded output to the first computer system or to the second computer system in order to be used as input for the second block of the two blocks. In one example of an AI model being split into more than three blocks, if input blocks S1(a) and S1(b) are deployed on two first computer systems respectively, the output of input block S1(a) may be encoded by the encoding protocol and the encoded output may be sent to the first computer system where S1(b) is deployed. The output may be decoded at the receiving first computer system using the encoding protocol and then used as input for block S1(b). In another example of an AI model being split into three blocks, the output of input block S1 may be encoded by the encoding protocol and the encoded output may be sent to the second computer system where S2 is deployed. The output may be decoded at the second computer system using the encoding protocol and then used as input for block S2. Similarly, the output of main block S2 may be encoded by the encoding protocol and the encoded output may be sent to the first computer system where input block S3 is deployed. The output may be decoded at the first computer system using the encoding protocol and then used as input for block S3.

According to one example, the encoding protocol comprises at least one of compression or encryption wherein the second encoding protocol comprises at least one of compression or encryption.

The encoding protocol may define a method of encoding of original data to obtain encoded data and define corresponding method of decoding that enables to restore the original data from the encoded data. The encoding of data may include any one of: encrypting, compressing, ciphering, formatting, or the assignment or interpretation of specific bit patterns to the data. This may secure communication of data. Alternatively, or additionally, this may ensure efficient utilization of network resources e.g., because compression may reduce the data size. For example, in case the encoding is performed by compressing the output, the decoding of the compressed output is performed by decompressing the compressed output. In case the encoding is performed by encrypting the output, the decoding of the encrypted output is performed by decrypting the encrypted output.

The present subject matter may have the following advantages. The present subject matter may introduce applicable data-preserving operations for artificial intelligence models to operate efficiently on constrained computing devices. The present subject matter may ensure optimal transmitted data sizes to ensure efficient utilization of network resources. The present subject matter may adjust the data preservation operations to cope with the variations of computing resource availability on constrained computing devices. The present subject matter may dynamically schedule model split ratios for artificial intelligence models to distribute the inferencing task across constrained first computer systems (e.g., edge computing devices) and second computer systems (e.g., cloud server instances). The present subject matter may introduce security for distributed inference using large and complex artificial intelligence models (e.g., Foundation Models) which may be processed efficiently on constrained computing environments, such as Edge computing and Internet of Things (IoT) devices.

According to one example, before executing the one or more input blocks, the one or more output blocks may be deleted from the first computer systems. For example, a management server may distribute the input block(s), the intermediate block and the output block(s) to the first computer system(s) and second computer system, respectively, while ensuring that the first computer system(s) can only process either the input block(s) or output block(s) at each time instance to ensure maximum utilization of hardware resources, e.g., the input block configuration may be deleted after execution, the encoding and the transmission to free up computational power for the output block. The management server may, for example, be configured to connect to the first and second computer systems and control operations of the first and second computer systems.

According to one example, after executing the one or more input blocks, the one or more output blocks may be deployed into the first computer system(s). For example, the one or more output blocks may be downloaded from the management server after execution of the one or more input blocks. This may further improve the resource usage of the first computer system because processing resources for maintaining the output block may be saved while the output block is not being used.

According to one example, after executing the one or more input blocks, the input blocks may be deleted and the one or more output blocks may be deployed into the first computer system. For example, the one or more output blocks may be downloaded from the management server after execution of the one or more input blocks. This may further improve the resource usage of the first computer system because only one block type may be processed and managed at a time by the first computer system(s).

According to one example, the execution of the artificial intelligence model comprises execution of a succession of processing steps, wherein splitting the artificial intelligence model is performed such that the input block is configured to perform a first number (N1) of first successive processing steps and the output block is configured to perform a third number (N3) of last successive processing steps, wherein the intermediate block is configured to perform a second number (N2) of successive processing steps that follow the first processing steps of the input block, wherein the sum of the first number, second number and the third number is the total number of processing steps in the artificial intelligence model, that is, N1+N2+N3 is the number of processing steps of the artificial intelligence model. The execution stages of the model which are defined before may comprise one or more processing steps of the model. In case the input block is further split to multiple input blocks, N1 refers to the first successive processing steps performed by all the input blocks. Similarly, in case the output block is further split to multiple output blocks, N3 refers to the last successive processing steps performed by all the output blocks.

According to one example, the first number N1 is smaller than the second number N2 by a first delta value, wherein the third number N3 is smaller than the second number N2 by a second delta value. For example, N2−N1<Δ1 and N2−N3<Δ2, where Δ1 is the first delta value and the Δ2 is the second delta value. The first delta value and second delta value are positive integers, Δ1>0 and Δ2>0. In one example, the first delta value and second delta value may be user defined values. This example, may enable a systematic and equally processing of the artificial intelligence model regardless of the available resources. This may particularly be advantageous in case the first computer system has enough resources to process even the whole artificial intelligence model locally.

The intermediate block may be referred to as the main block as it may comprise most of the processing steps of the artificial intelligence model.

According to one example, the method further comprises determining the first number N1 and third number N3 based on available resources in the first computer system. Alternatively, instead of determining N1 and N3, the delta values Δ1 and Δ2 may be determined in this example. The determination may, for example, be performed such that the numbers N1 and N3 are as high as possible given the available resources.

For example, given a set of hardware specifications such as RAM, CPU Clock, Cache of the first computer system and given a predicted usage of said specifications regarding the computational complexity of the artificial intelligence model, the numbers N1 and N3 (or Δ1 and Δ2) may accurately be estimated. This example may enable to provide as high as possible the number of processing steps performed by the input and output blocks, wherein the higher the numbers N1 and N3 the more secure execution of the artificial intelligence model is. This is because the processing is done locally and the output of the input block may be unpredictable.

According to one example, the artificial intelligence model is a trained model. In this case, the execution of the artificial intelligence model using the present methods is an inference of the artificial intelligence model.

According to one example, the first computer system has an amount of processing resources which is smaller than the processing resources of the second computer system. The second computer system may be any computer system that has processing resources for executing any defined intermediate block of the artificial intelligence model. For example, the second computer system may be any computer system that has processing resources for executing the whole artificial intelligence model.

According to one example, the second computer system is provided as a service in a cloud computing environment. In one example, the second computer system may be provided as a cloud instance in the cloud computing environment. The cloud instance may be a server resource provided by cloud services. In one example, the second computer system may be implemented using one or more functional abstraction layers provided by the cloud computing environment e.g., the hardware and software resources of the second computer system may be provided by the hardware and software layer of the cloud computing environment. The workload layer of the cloud computing environment may for example be used to implement the steps to be executed by the second computer system. The cloud computing environment may remain unaware of any data and output labels as it does not possess the complete artificial intelligence model and external model inversion and/or reverse-engineering attacks may be mitigated by the secure model encoding, thus preserving data. The inference may thus take place exclusively and securely at the edge device, making use of the cloud environment as a pure computing and processing instance without knowledge about the particular use case and inference outcomes of the edge device.

According to one example, the artificial intelligence model is a foundation model. The foundation model may be a large artificial intelligence model trained on a vast quantity of data at scale resulting in a model that can be adapted to a wide range of downstream tasks. Examples of foundation models include Bidirectional Encoder Representations from Transformers (BERT) and the Generative Pre-trained Transformer n series (GPT-n series). The first and last foundation model (FM) layers are processed on-device and their intermediate cut-layer activations are securely transmitted (received) by applying compression (decompression) while guaranteeing communication efficient low-bandwidth transmissions.

According to one example, the artificial intelligence model is a deep neural network, wherein the input block represents first network layers, the intermediate block represents middle network layers; and the output block represents last network layers. Following this example, each processing step of the artificial intelligence model may represent the processing performed for a respective layer of the deep neural network. That is, the input block comprises N1 first layers of the deep neural network, the intermediate block comprises N2 layers of the deep neural network and the output block comprises N3 last layers of the deep neural network, where the total number of layers in the deep neural network is N1+N2+N3.

According to one example, the first computer system is any one of: edge device (e.g., such as a MEC node), user equipment (UE) or an internet of things (IoT) device. This example may be seamlessly integrated in wireless or mobile communication systems. The mobile communication system provides wireless connectivity to users. The users may, for example, comprise mobile devices, tablets, laptops or individuals. The mobile communication system may comprise a radio access network (RAN) and a core network. The core network may provide Internet Protocol (IP) connectivity to the radio access network. The radio access network may manage the radio spectrum of users using radio devices such as base stations. The radio access network may enable to process packets in accordance with a processing pipeline. The processing pipeline has different layers. The layers include baseband processing layers and radio frequency (RF) processing layers. The baseband processing layers may be defined in accordance with a protocol stack and may be performed by a baseband unit, wherein the baseband unit is comprised in the edge device.

The baseband unit may be associated with one or more base stations. For example, each base station of the one or more base stations may serve users located within the base station's geographical area of service or a cell. The baseband unit may process baseband signals for served users of the one or more base stations. Thus, the baseband unit is said to be serving said users. The baseband unit may implement the layers of the protocol stack such as the Packet Data Convergence Protocol (PDCP) layer, Radio Link Control (RLC) layer, Medium Access Control (MAC) layer and Physical (PHY) layer. In one example, the baseband unit may be divided into function entities each being configured to perform a respective function e.g., a function may implement one or more layers of the stack protocol. For example, the baseband unit may be divided into two function entities named Centralized Unit (CU) and Distributed Unit (DU). The CU may provide support for the higher layers of the protocol stack such as the PDCP layer while the DU provides support for the lower layers of the protocol stack such as the RLC, MAC and Physical layers.

The implementation of the baseband unit may be realized with a specific hardware and software configuration of the edge device. The software configuration of the baseband unit may comprise an operating system and software modules for performing the functions of the baseband unit. In addition, the software configuration may indicate one or more vendors that provide the software configuration. For example, the operating system and software modules may be provided by one or more vendors. The hardware configuration may comprise storage resources, data communication resources and processing resources. In addition, the hardware configuration may indicate one or more vendors that provide the hardware configuration. The resources may be provided by one or more vendors.

FIG. 1 depicts a diagram of a wireless communication system in accordance with an example of the present subject matter.

The wireless communication system 100 comprises a core network 101 and a radio access network 102. The radio access network 102 may comprise a remote radio component 107 equipped by, but not limited to, base stations 109 and 111. Each base station 109 or 111 may comprise a remote radio unit (RRU) with antennas and may serve UEs 120 in respective cells 121 and 122. The radio access network 102 may further comprise first computer systems 103. For simplification of the description only three first computer systems are shown but it is not limited to. Also, only components of one first computer system are described for simplification of the drawings.

The first computer system 103 may, for example, comprise a set of one or more baseband units (BBUs) 105.1-*n*. The baseband unit may be connected to a respective RRU in the remote radio component 107 through a fiber or cable 113. The first computer system 103 may be configured to connect to the core network 101 via a backhaul link 115. The first computer system 103 may comprise a central unit 117 which is configured to control the operation and deployment of the baseband units 105.1-*n*. Each of the first computer systems 103 may, for example, be provided as a MEC node. The MEC nodes may improve user services (e.g., with a low latency). The first computer system 103 may, for example, process data provided by the BBUs using advanced techniques e.g., for image analysis. The radio access network 102 may comprise a control unit 110 for managing workloads in the wireless communication system 100.

The remote radio component 107 and the first computer system 103 may be configured to connect to a cloud computing environment 130. The cloud computing environment 130 may comprise a second computer system 131. In one example, the second computer system 131 may be provided as a cloud instance in the cloud computing environment 130.

In one example implementation, the cloud computing environment 130 may, for example, be provided as described with reference to FIGS. 8 and 9. For example, the second computer system 131 may be implemented using one or more functional abstraction layers provided by the cloud computing environment 130 e.g., the hardware and software resources of the second computer system 131 may be provided by the hardware and software layer of the cloud computing environment 130. The workload layer of the cloud computing environment 130 may for example be used to implement the execution of the main block of the AI model by the second computer system 131.

In one example implementation, the system 100 may be provided as an Open Radio Access Network (O-RAN), where the first computer system 103 may be in one or more edge sites and the remote radio component 107 may be in one or more cell sites.

Figure 2:
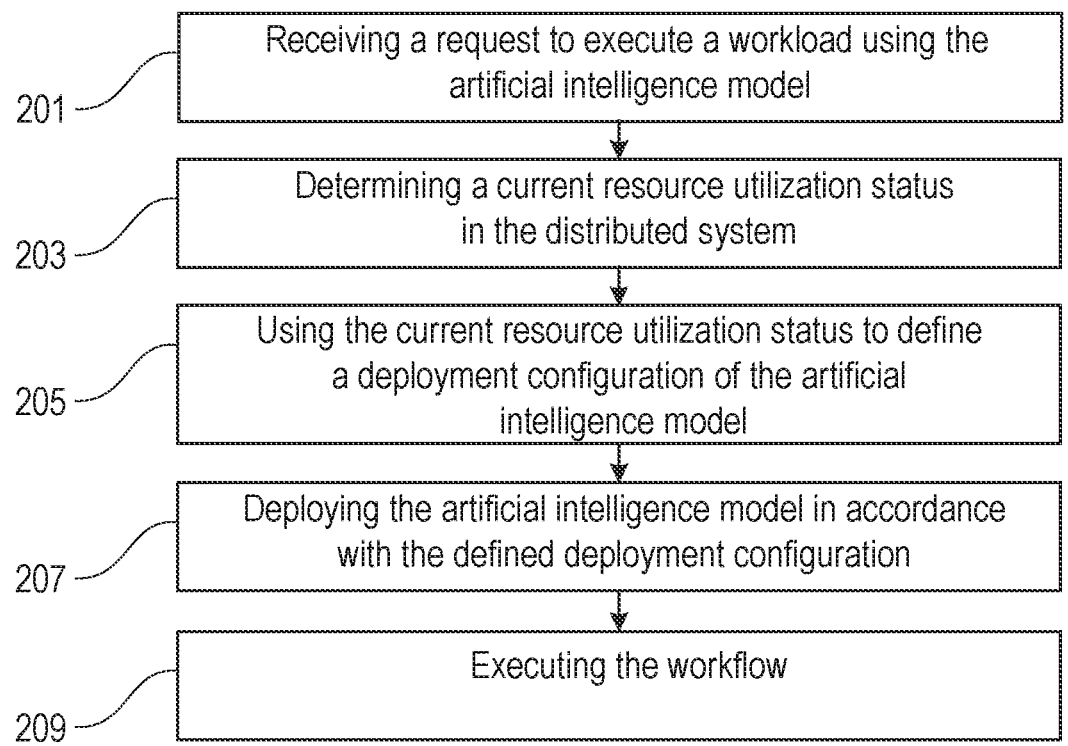
FIG. 2 is a flowchart of a method for executing workloads in a distributed system in accordance with an example of the present subject matter.

FIG. 2 is a flowchart of a method for executing an artificial intelligence model in accordance with an example of the present subject matter. For the purpose of explanation, the method of FIG. 2 may be implemented in the system of FIG. 1, but it is not limited to. The method may, for example, be performed by the control unit 110.

A request to execute a workload using the artificial intelligence model may be received in step 201. The workload may comprise a step of receiving the specific input to be used as input of the artificial intelligence model. A current resource utilization status in the distributed system may be determined in step 203. The current resource utilization status may be used in step 205 to define a deployment configuration of the artificial intelligence model. The deployment configuration may be defined by: a number and structure of input blocks, a number and structure of output blocks and the intermediate block of the artificial intelligence model, a second computer system to execute the intermediate block, and one or more first computer systems to execute the input and output blocks. The artificial intelligence model may be deployed in step 207 in accordance with the defined deployment configuration. The workload may be executed in step 209.

Figure 3:
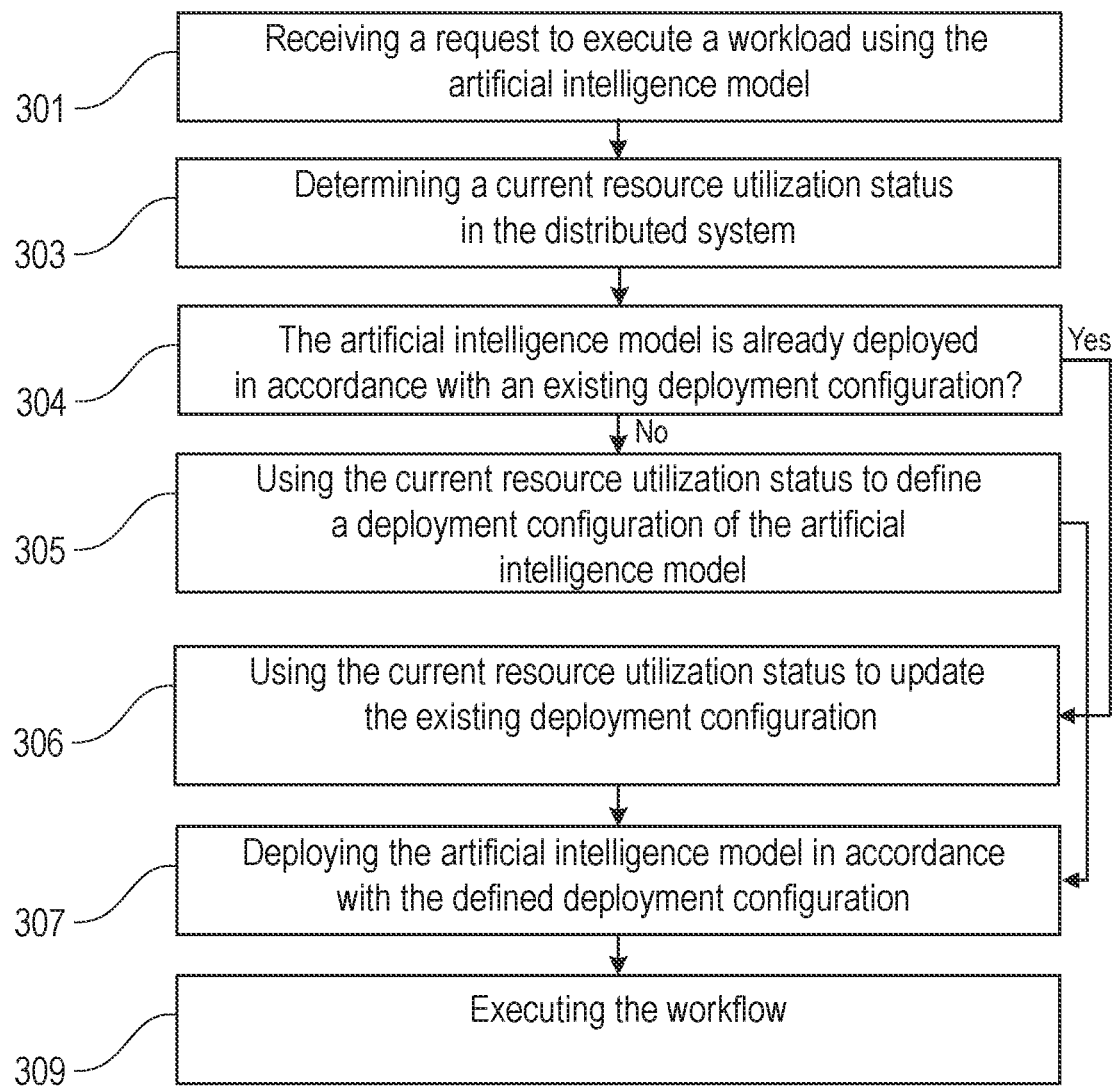
FIG. 3 is a flowchart of a method for executing workloads in a distributed system in accordance with an example of the present subject matter.

FIG. 3 is a flowchart of a method for executing an artificial intelligence model in accordance with an example of the present subject matter. For the purpose of explanation, the method of FIG. 3 may be implemented in the system of FIG. 1, but it is not limited to. The method may, for example, be performed by the control unit 110.

A request to execute a workload using the artificial intelligence model may be received in step 301. The workload may comprise a step of receiving the specific input to be used as input of the artificial intelligence model. A current resource utilization status in the distributed system may be determined in step 303. It may be determined in step 304 whether the artificial intelligence model is already deployed in accordance with an existing deployment configuration. In case the artificial intelligence model is not yet deployed, the current resource utilization status may be used in step 305 to define a deployment configuration of the artificial intelligence model. In case the artificial intelligence model is already deployed, the current resource utilization status may be used in step 306 to update the existing deployment configuration of the artificial intelligence model. The deployment configuration may be defined by: a number and structure of input blocks, a number and structure of output blocks and the intermediate block of the artificial intelligence model, a second computer system to execute the intermediate block, and one or more first computer systems to execute the input and output blocks. The artificial intelligence model may be deployed in step 307 in accordance with the defined deployment configuration. The workload may be executed in step 309.

Figure 4:
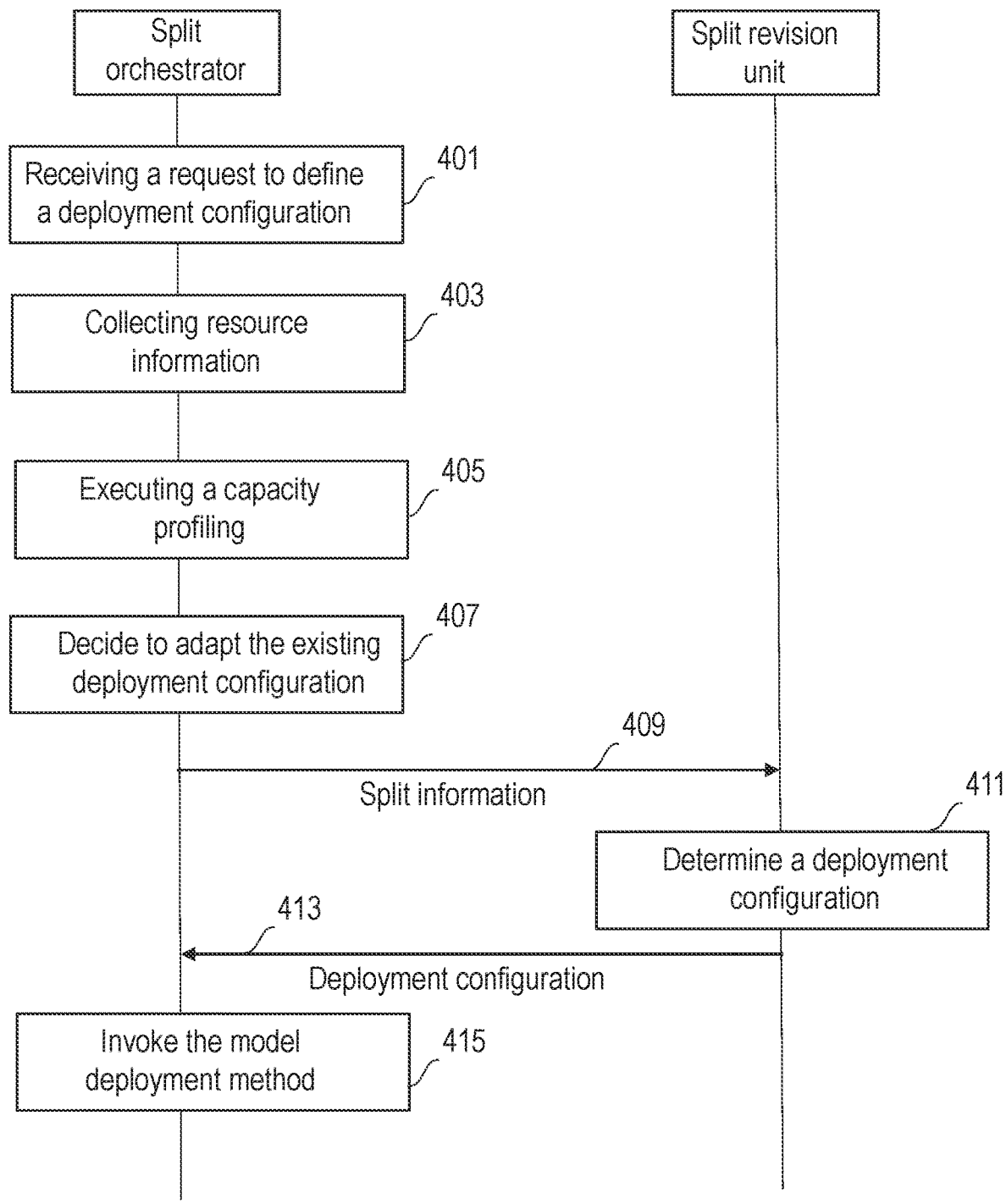
FIG. 4 is a signaling diagram illustrating a method for defining a deployment configuration in accordance with an example of the present subject matter.

FIG. 4 is a signalling diagram illustrating a method for defining a deployment configuration of the artificial intelligence model in accordance with an example of the present subject matter. The method of FIG. 4 may provide an example implementation of step 205 of FIG. 2 and step 305 of FIG. 3. The method may for example be performed by a split orchestrator and a split revision unit. The split orchestrator and a split revision unit may, for example, be part of the control unit 110.

The split orchestrator may receive in step 401 a request to define a deployment configuration for the AI model. The split orchestrator may collect in step 403 a set of resource information regarding the current resource utilization status of the distributed system. The resource information may include hardware specifications such as RAM, CPU, Memory, Cache of the first computer systems and second computer system. The resource information may further include the computational situation e.g., in terms of hardware utilization and node occupation, in the distributed system. The resource information may further include the network situation such as link reliability, latency, data transfer speeds between the first computer systems and between the first computer systems and the second computer system. The split orchestrator may execute in step 405 the capacity profiling method to evaluate the capacity of each first computer system to execute some existing AI model block given the current context. Using the collected resource information and the outcome of the capacity profiling, the split orchestrator may decide in step 407 whether to update the existing deployment configuration or not. In case it is decided to update the existing deployment configuration, the split orchestrator may send a request in step 409 to the split revision unit for revising the split of the AI model. The request may be sent together with information (named split information), wherein the split information may be prepared by the split orchestrator. The split information may, for example, include at least part of the resource information. In one example, the split information may include a set of computation and network situations for all first computer systems and issues a node rating with respect to current utilization and computational/operational environments to determine a priority list of best first computer systems which qualify for further consideration.

The split revision unit may use the split information in step 411 in order to find a new deployment configuration. In particular, the split revision unit may find a new set of AI model blocks. The split revision unit may further use one or more rules for finding the deployment configurations. The rule may for example include specific Quality of Service (QoS) requirements to be considered for the optimal model re-split. The rule may further require a desired trade-off between energy-efficiency (EE), number of cut-layers CL per model (i.e., number of blocks). The split revision unit may send in step 413 the new deployment configuration to the split orchestrator. The split orchestrator may invoke in step 415 the model deployment method in order to distribute the new split model across the collaborating first computer systems and second computer system.

Figure 5:
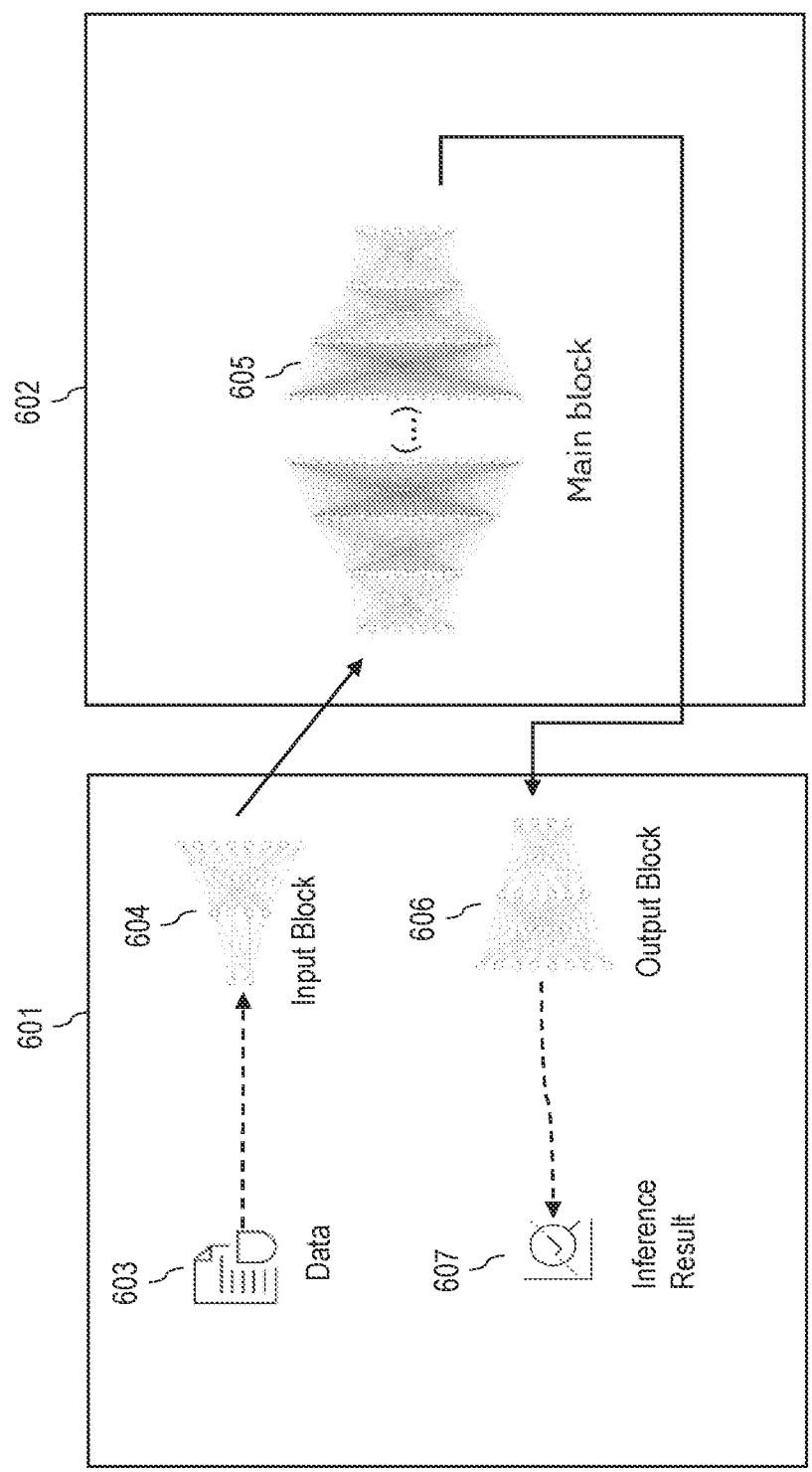
FIG. 5 is a diagram illustrating the AI model splitting in accordance with an example of the present subject matter.

FIG. 5 is a diagram illustrating a method for splitting a Foundation Model. The Foundation Model may be split into three blocks. As shown, a first computer system 601 may comprise the input block 604 and the output block 606 while a remote second computer system 602 comprises the main block 605. The input data 603 may be received at the first computer system 601 and processed by the input block 604. The output of the input block 604 may be processed by the main block 605 in the second computer system 602. In turn, the output of the main block 605 may be processed by the output block 606 in order to obtain an inference result 607 of the input data 603.

Figure 6A:
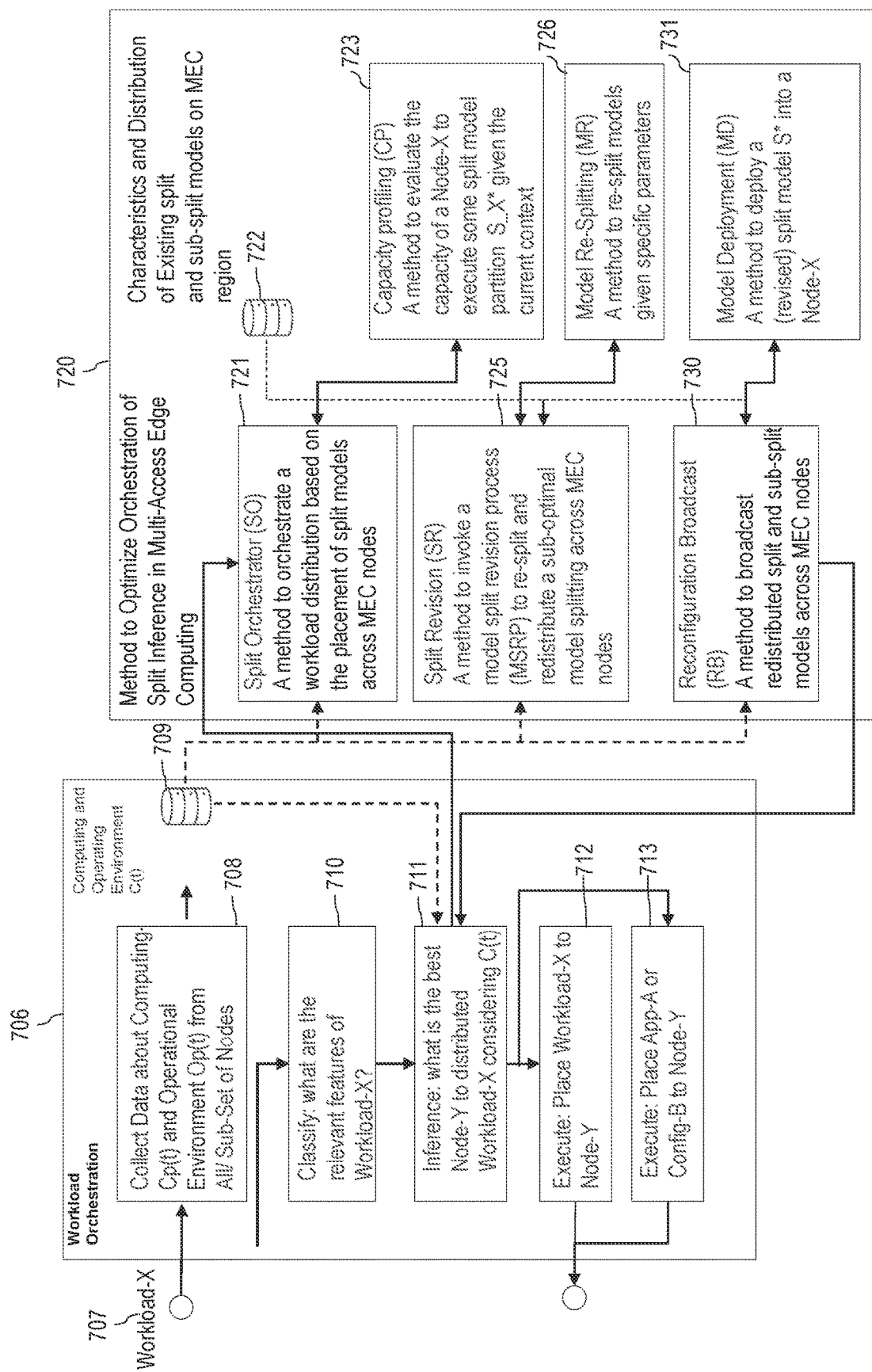
FIG. 6A is a diagram illustrating a method for executing workloads in a distributed system in accordance with an example of the present subject matter.
Figure 6B:
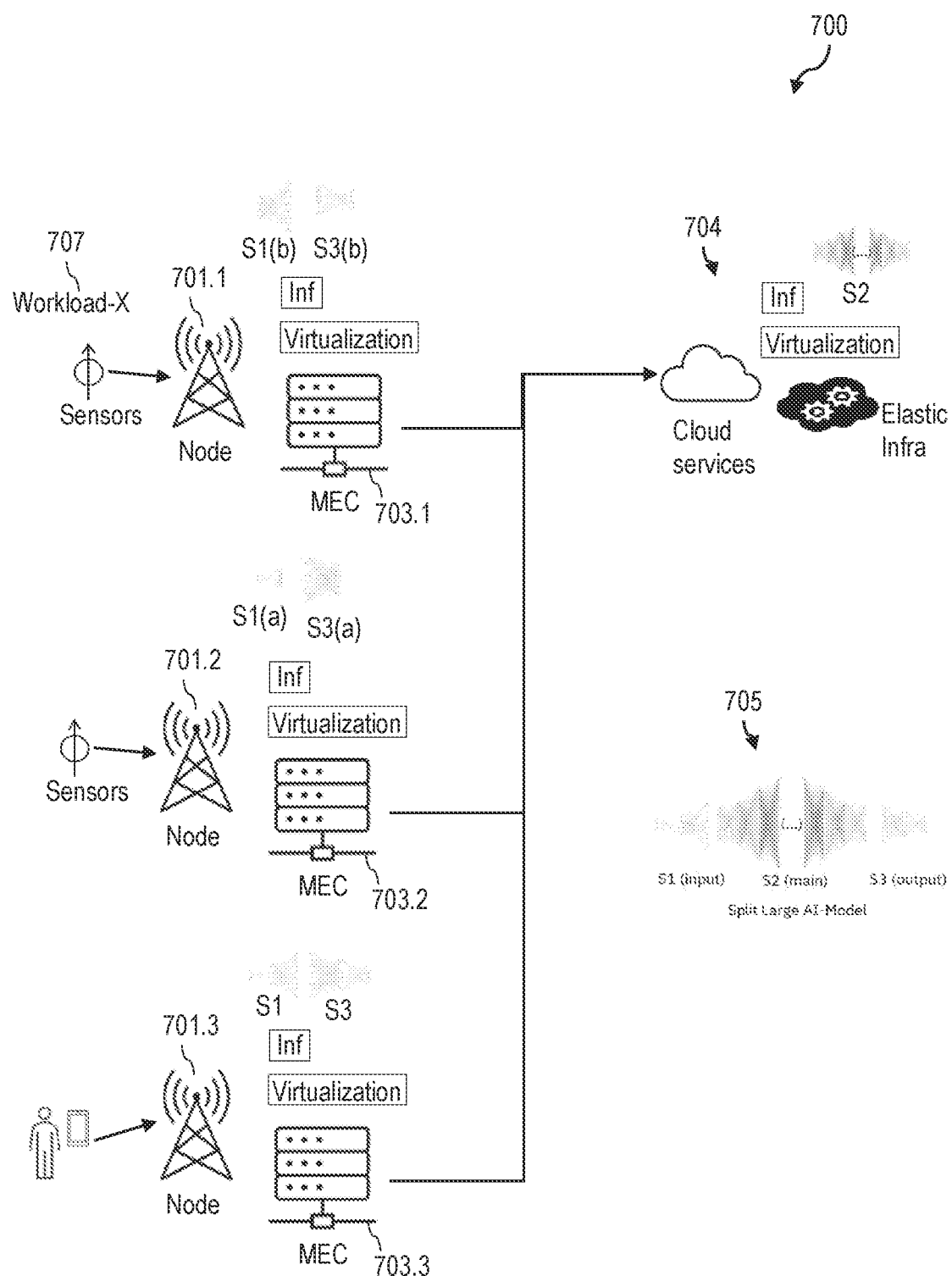
FIG. 6B is a diagram of a distributed system in accordance with an example of the present subject matter.

FIG. 6A is a diagram illustrating a method for workload orchestration in a distributed system shown in FIG. 6B in accordance with an example of the present subject matter.

The distributed system 700 may comprise a wireless communication system comprising nodes 701.1, 701.2 and 701.3 such as 5G base stations. The nodes 701.1, 701.2 and 701.3 may server user equipment such as sensors in their respective geographical areas of service. The nodes 701.1, 701.2 and 701.3 may be associated with MEC nodes 703.1, 703.2 and 703.3 respectively. The MEC nodes 703.1, 703.2 and 703.3 may enable to process data provided by the nodes 701.1, 701.2 and 701.3 respectively. MEC nodes 703.1, 703.2 and 703.3 may be configured to process data using a virtualization of the resources. The distributed system 700 may further comprise a cloud system 704. The cloud system 704 may enable cloud services for the MEC nodes 703.1-3 and may provide resources using virtualization techniques.

The distributed system 700 may be used to execute workloads, where the workload may involve execution of an artificial intelligence model 705. The artificial intelligence model 705 may be configured to be split into blocks including at least three blocks, the input block, the main block and the output block. In this example, the artificial intelligence model 705 may be initially split into three blocks S1, S2 and S3 and deployed. For example, the input and output blocks S1 and S3 are deployed on the MEC node 703.3 and the main block S2 is deployed on the cloud system 704. Each of these three blocks may be referred to as split model.

FIG. 6A depicts a method 706 for workload orchestration in the distributed system. Upon receiving a workload 707, the method 706 starts by collecting in step 708 resource information about computing and operational environment from all MEC nodes 703.1, 703.2 and 703.3 and optionally from the cloud system 704. This may be performed using stored information 709 on the distributed system. In step 710, the workload 707 may be classified by for example determining relevant features of the workload such as the required CPU to run the workload, whether the workload is critical etc. In step 711, a deployment configuration may be determined for executing the workload. For example, the determined deployment configuration may be the existing deployment configuration (i.e., the existing one is maintained) or a new deployment configuration. The whole workload may be placed in step 712 using the deployment configuration and then executed or only part of the workload may be placed in step 713 using the deployment configuration and then executed.

Step 711 may be executed using an optimization method 720. The optimization method 720 may comprise a split orchestration (SO) method 721, a split revision (SR) method 725 and a reconfiguration broadcast (RB) method 730.

The split orchestration method 721 may orchestrate a workload distribution based on the placement of split models across the MEC nodes 703.1-703.3. The split orchestration method 721 may be performed by a split orchestrator. The split orchestrator may decide whether the inference of blocks S1 and/or S3 shall take place entirely on the MEC edge node 703.3 or needs to be distributed collaboratively among node 703.3 and other candidate nodes by taking into account the given assessment determined by the capacity profiling (CP) method 723 and some additional constraints such as a threshold of maximum MEC node utilization. The capacity profiling method 723 may evaluate the capacity of a Node-X to execute some split model partition S_X* given the current context. Given information about computation and network situations across the connected MEC nodes, the CP method 723 may evaluate whether a Node-X can process the split model partition S_X* for a given non-inference-related Workload-Z under the current computing and operating environment. Indeed, workloads may consist of existing AI workloads of other services/apps and non-AI workloads such as BBU processing, some analytics of the mobile network operator, etc. In this case, the method aims to collect both types of workloads and determine whether the AI workload (the split S_X*) fits into this Node-X. The decision of the split orchestrator may be obtained given at least one of the following collected resource information i1) to i6): i1) a set of MEC nodes' hardware specifications such as RAM, CPU, Memory and Cache; i2) information about the computational situation (e.g., hardware utilization, node occupation) i3) information about the network situation (e.g., link reliability, latency, data transfer speeds); i4) the assessment whether the inference of existing split models S1 and/or S3 can be processed on the MEC node, provided by the Capacity Profiling (CP) method 723 i5) the equivalent set of information for some candidate nodes in a connected MEC region i6) further information about existing application load orchestrating mechanisms such as Kubernetes clusters and/or MEC related services as well as their respective API endpoints. Dependent on the decision, the split orchestrator might invoke a continuation of the inference on the MEC edge node 703.3 according to the previous model split S=(S1, S2, S3) or invoke the split revision method 725 to start a Model Split Revision Process (MSRP) in order to determine a better (or best) model split S*=(S1*, S2*, S3*, . . . ). If the split revision method 725 needs to be invoked, the split orchestrator provides above set of computation and network situations for all candidate nodes and issues a node rating with respect to current utilization and computational/operational environments to determine a priority list of best MEC nodes which qualify for further consideration. After the MSRP has been processed, the split orchestrator invokes the model deployment (MD) method 731 in order to distribute the new split inference workload across the collaborating MEC nodes and within a potentially existing application workload orchestration infrastructure. This is indicated in FIG. 6B where the new split models comprise input blocks S1(a) and S1(b) and output blocks S3(a) S3(b) in addition to the main block S2. The blocks S1(a), and S3(a) are deployed on the MEC node 703.2 and the blocks S1(b), and S3(b) are deployed on the MEC node 703.1.

The splitting of the AI model may, for example, be performed as follows. The split revision method 725 may invoke the model split revision process (MSRP) to re-split and redistribute a model splitting across the MEC nodes. The best model split S*=(S1*, S2*, S3*) may be chosen according to MEC node specific computational and operational situations as well as rule-based decisions such as thresholds for the number of maximum collaborating MEC nodes or rules within a potentially existing workload orchestration infrastructure. The best model split may be chosen given at least one of the following split information j1) to j5) which may be stored in the storage 722: j1) the original FM model split S=(S1, S2, S3) and the computational complexities of the respective model partitions j2) a priority list of best MEC nodes with respect to computation and operational situations provided by the split orchestrator j3) additional constraints provided by the split orchestrator and MEC node-dependent QoS requirements to be considered for the optimal model re-split j4) a desired trade-off between energy-efficiency (EE), number of cut-layers CL per model partition and number of total partitions TP (e.g. S1, S2, S3, . . . , S_TP), j5) a set of available online and offline algorithms for achieving model splits with respect to EE. CL and TP trade-offs provided by the model re-splitting (MR) method 726. This MR method may be realized as follows, for example: a rule-based engine populated with rules that correlate certain specific parameters (e.g. memory/CPU capacity and load/idleness, processing power, context, edge profiling, edge load prediction, etc.) with actions may be implemented, and augmented by a) a learning scheme (e.g. reinforcement learning) on top of aforementioned rules, along with a method for assessing the performance b) a set of functions to pre-process inbounding information and post-process the obtained results for further consideration in the optimization process c) voting system to allow multiple rule based processes to compete for the best action to take, wherein the action is to find a deployment configuration of the AI model d) a speculative assessment system (e.g. a/b testing) to allow for experimentation and assessment of new rule configurations. Using steps a) and b) may result in multiple actions or multiple candidate deployment configurations of the AI model. Step c) and/or step d) may be used to select one of the candidate deployment configurations. In step a) the Reinforcement Learning may enable a set of states, actions and rewards which are defined and learned in a (deep) neural network to achieve rules to find the best splitting policies with respect to the current system. In step b) the set of functions may be a set of deterministic functions based on expert knowledge, experience and infrastructure/architectural knowledge of the deployment system. Alternatively, certain heuristics such as ones used on task scheduling and load balancing (e.g., Simulated Annealing) may be used instead of the rule-based engine.

The reconfiguration broadcast method 730 may broadcast the redistributed split and sub-split models across MEC nodes. The method may redistribute the new splitting S* to the selected MEC nodes in the MEC region, deploys the model partitions via the model deployment (MD) method 731, synchronize information on the current split ratio and information on the participating MEC nodes environments and signal this to the split orchestrator after which the inference process can be started. This may be performed using the adapted FM model splitting S*=(S1*, S2*, S3*, . . . ) provided by the MSRP and the selected MEC edge nodes (X1, X2, X3, . . . ) to perform said split inference.

The present subject matter may comprise the following clauses.

Clause 1. A method for executing workloads in a distributed system using an artificial intelligence model, the distributed system comprising a set of first computer systems which are configured to connect to at least one second computer system of the distributed system, the artificial intelligence model being configured to receive a specific input, process the specific input and provide a specific output, the artificial intelligence model being configured to be split into a set of one or more input blocks, an intermediate block and a set of one or more output blocks, such that the set of one or more input blocks receive the specific input and provides an intermediate output, the intermediate block receives as input the intermediate output and provides another intermediate output, and the set of one or more output blocks receive as input the other intermediate output and provides said specific output, the method comprising an orchestration method comprising: receiving a request to execute a workload using the artificial intelligence model, the workload comprising receiving the specific input; determining a current resource utilization status in the distributed system; using the current resource utilization status to define a deployment configuration of the artificial intelligence model, wherein the deployment configuration is defined by:

a number and structure of input blocks, a number and structure of output blocks and the intermediate block of the artificial intelligence model, a second computer system to execute the intermediate block, and one or more first computer systems to execute the input and output blocks; deploying the artificial intelligence model in accordance with the defined deployment configuration and executing the workload.

Clause 2. The method of clause 1, before executing the block, the method comprises deploying the artificial intelligence model in accordance with an initial deployment configuration, wherein defining the deployment configuration comprises updating the initial deployment configuration, the updating comprising at least one of: re-splitting the artificial intelligence model; adding one or more first computer systems to execute the input and output blocks; removing one or more of the initial first computer systems to execute the input and output blocks; or selecting another second computer system to execute the intermediate block.

Clause 3. The method of any of the preceding clauses 1 to 2, wherein using the current resource utilization status to define the deployment configuration comprises: performing a capacity profiling of the first and second computer systems to determine whether each of the first and second computer systems can execute one or more blocks of the artificial intelligence model; and defining the deployment configuration based on the capacity profiling.

Clause 4. The method of any of the preceding clauses 1 to 3, The method of claim 1, wherein the current resource utilization status is defined by at least one of: utilization level of network resources of the distributed system; utilization level of resources of the first computer systems; or utilization level of resources of the second computer systems.

Clause 5. The method of any of the preceding clauses 1 to 4, wherein the deployment configuration is defined further using a rule, the rule requiring at least one of: a maximum number of first computer systems to be used for deploying the input and output blocks; a maximum number of blocks of the artificial intelligence model; a fulfilment of a specific Quality of Service (QOS) requirement; or a desired energy-efficiency (EE).

Clause 6. The method of any of the preceding clauses 1 to 5, the distributed system being a wireless communication system, wherein the first computer systems are multi-access edge computing (MEC) nodes and the second computer system is a cloud system.

Clause 7. The method of any of the preceding clauses 1 to 6, further comprising: executing the deployment of the artificial intelligence model by a broadcaster of the distributed system; sending by the broadcaster an information to an orchestrator of the distributed system, such that the orchestrator triggers the execution of the workload upon receiving the information.

Clause 8. The method of any of the preceding clauses 1 to 7, wherein the artificial intelligence model is a foundation model.

Clause 9. The method of any of the preceding clauses 1 to 8, wherein the artificial intelligence model is a deep neural network, wherein the input block represents first network layers, the intermediate block represents middle network layers; and the output block represents last network layers.

Clause 10. The method of any of the preceding clauses 1 to 9, wherein the first computer system has an amount of processing resources which is smaller than the processing resources of the second computer system.

Clause 11. The method of any of the preceding clauses 1 to 10, wherein the workload involves at least one of: data analytics, sensor measurement fusion from different sources, or processing data streams destined to a cloud.

Clause 12. The method of any of the preceding clauses 1 to 11, the executing of the artificial model comprises for each two consecutive blocks of the artificial model which are deployed on different systems: encoding using an encoding protocol the output of the first block of the two blocks, and sending the encoded output to the first computer system or to the second computer system in order to be used as input for the second block of the two blocks.

Clause 13. The method of clause 12, wherein the encoding protocol comprises at least one of compression or encryption wherein the second encoding protocol comprises at least one of compression or encryption.

Figure 7:
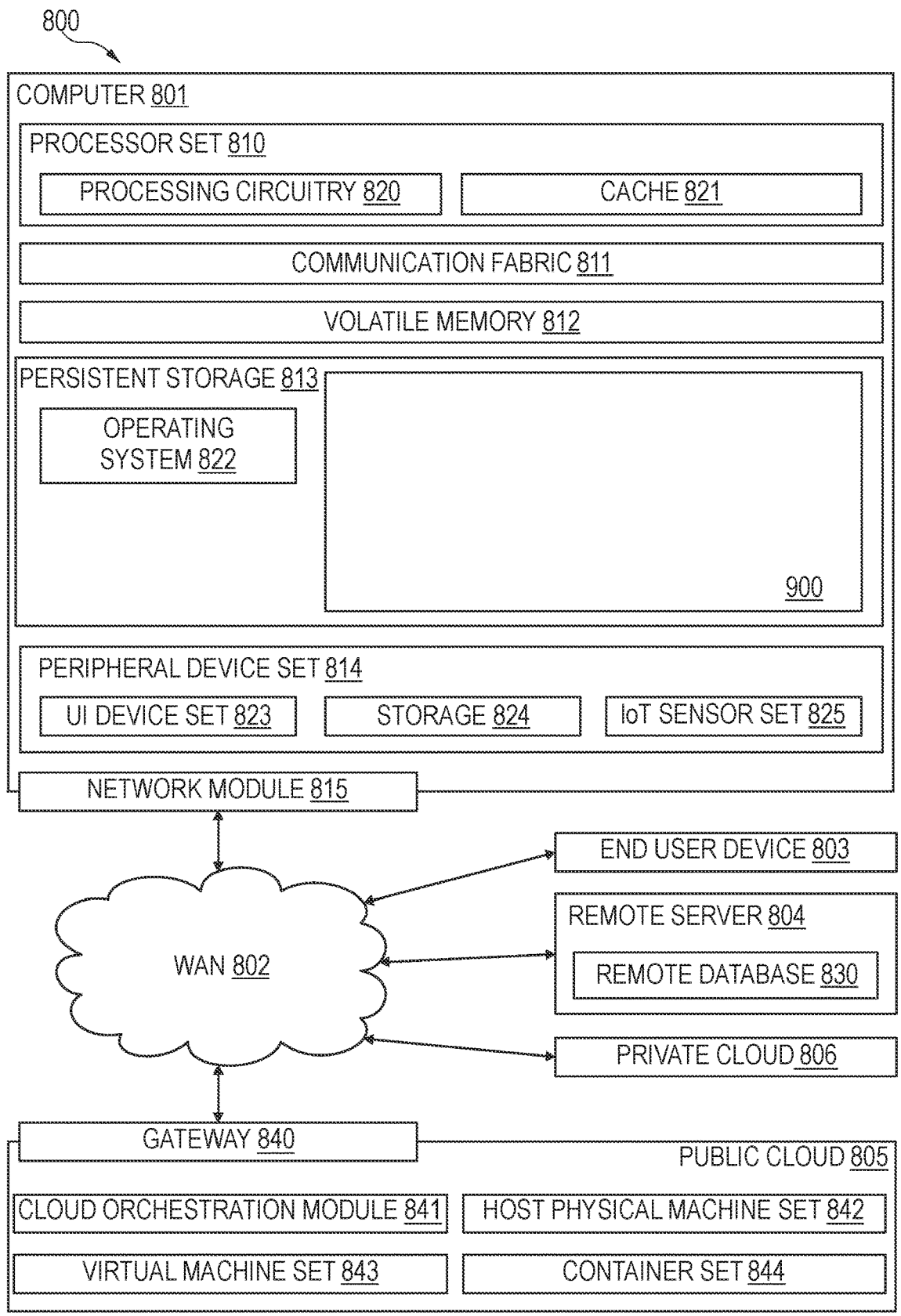
FIG. 7 is a computing environment in accordance with an example of the present subject matter.

Referring now to FIG. 7, computing environment 800 contains an example of an environment for the execution of at least some of the computer code involved in performing the inventive methods, such as code 900 for workload orchestration. In addition to block 900, computing environment 800 includes, for example, computer 801, wide area network (WAN) 802, end user device (EUD) 803, remote server 804, public cloud 805, and private cloud 806. In this embodiment, computer 801 includes processor set 810 (including processing circuitry 820 and cache 821), communication fabric 811, volatile memory 812, persistent storage 813 (including operating system 822 and block 900, as identified above), peripheral device set 814 (including user interface (UI) device set 823, storage 824, and Internet of Things (IoT) sensor set 825), and network module 815. Remote server 804 includes remote database 830. Public cloud 805 includes gateway 840, cloud orchestration module 841, host physical machine set 842, virtual machine set 843, and container set 844.

COMPUTER 801 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 830. As is well understood in the art of computer technology, and depending upon the technology, performance of a computer-implemented method may be distributed among multiple computers and/or between multiple locations. On the other hand, in this presentation of computing environment 800, detailed discussion is focused on a single computer, specifically computer 801, to keep the presentation as simple as possible. Computer 801 may be located in a cloud, even though it is not shown in a cloud in FIG. 7. On the other hand, computer 801 is not required to be in a cloud except to any extent as may be affirmatively indicated.

PROCESSOR SET 810 includes one, or more, computer processors of any type now known or to be developed in the future. Processing circuitry 820 may be distributed over multiple packages, for example, multiple, coordinated integrated circuit chips. Processing circuitry 820 may implement multiple processor threads and/or multiple processor cores. Cache 821 is memory that is located in the processor chip package(s) and is typically used for data or code that should be available for rapid access by the threads or cores running on processor set 810. Cache memories are typically organized into multiple levels depending upon relative proximity to the processing circuitry. Alternatively, some, or all, of the cache for the processor set may be located "off chip."

In some computing environments, processor set 810 may be designed for working with qubits and performing quantum computing.

Computer readable program instructions are typically loaded onto computer 801 to cause a series of operational steps to be performed by processor set 810 of computer 801 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 821 and the other storage media discussed below. The program instructions, and associated data, are accessed by processor set 810 to control and direct performance of the inventive methods. In computing environment 800, at least some of the instructions for performing the inventive methods may be stored in block 900 in persistent storage 813.

COMMUNICATION FABRIC 811 is the signal conduction path that allows the various components of computer 801 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 812 is any type of volatile memory now known or to be developed in the future. Examples include dynamic type random access memory (RAM) or static type RAM. Typically, volatile memory 812 is characterized by random access, but this is not required unless affirmatively indicated. In computer 801, the volatile memory 812 is located in a single package and is internal to computer 801, but, alternatively or additionally, the volatile memory may be distributed over multiple packages and/or located externally with respect to computer 801.

PERSISTENT STORAGE 813 is any form of non-volatile storage for computers that is now known or to be developed in the future. The non-volatility of this storage means that the stored data is maintained regardless of whether power is being supplied to computer 801 and/or directly to persistent storage 813. Persistent storage 813 may be a read only memory (ROM), but typically at least a portion of the persistent storage allows writing of data, deletion of data and re-writing of data. Some familiar forms of persistent storage include magnetic disks and solid state storage devices. Operating system 822 may take several forms, such as various known proprietary operating systems or open source Portable Operating System Interface-type operating systems that employ a kernel. The code included in block 900 typically includes at least some of the computer code involved in performing the inventive methods.

PERIPHERAL DEVICE SET 814 includes the set of peripheral devices of computer 801. Data communication connections between the peripheral devices and the other components of computer 801 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 823 may include components such as a display screen, speaker, microphone, wearable devices (such as goggles and smart watches), keyboard, mouse, printer, touchpad, game controllers, and haptic devices. Storage 824 is external storage, such as an external hard drive, or insertable storage, such as an SD card. Storage 824 may be persistent and/or volatile. In some embodiments, storage 824 may take the form of a quantum computing storage device for storing data in the form of qubits. In embodiments where computer 801 is required to have a large amount of storage (for example, where computer 801 locally stores and manages a large database) then this storage may be provided by peripheral storage devices designed for storing very large amounts of data, such as a storage area network (SAN) that is shared by multiple, geographically distributed computers. IoT sensor set 825 is made up of sensors that can be used in Internet of Things applications. For example, one sensor may be a thermometer and another sensor may be a motion detector.

NETWORK MODULE 815 is the collection of computer software, hardware, and firmware that allows computer 801 to communicate with other computers through WAN 802. Network module 815 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 815 are performed on the same physical hardware device. In other embodiments (for example, embodiments that utilize software-defined networking (SDN)), the control functions and the forwarding functions of network module 815 are performed on physically separate devices, such that the control functions manage several different network hardware devices. Computer readable program instructions for performing the inventive methods can typically be downloaded to computer 801 from an external computer or external storage device through a network adapter card or network interface included in network module 815.

WAN 802 is any wide area network (for example, the internet) capable of communicating computer data over non-local distances by any technology for communicating computer data, now known or to be developed in the future. In some embodiments, the WAN 802 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 803 is any computer system that is used and controlled by an end user (for example, a customer of an enterprise that operates computer 801), and may take any of the forms discussed above in connection with computer 801. EUD 803 typically receives helpful and useful data from the operations of computer 801. For example, in a hypothetical case where computer 801 is designed to provide a recommendation to an end user, this recommendation would typically be communicated from network module 815 of computer 801 through WAN 802 to EUD 803. In this way, EUD 803 can display, or otherwise present, the recommendation to an end user. In some embodiments, EUD 803 may be a client device, such as thin client, heavy client, mainframe computer, desktop computer and so on.

REMOTE SERVER 804 is any computer system that serves at least some data and/or functionality to computer

801. Remote server 804 may be controlled and used by the same entity that operates computer 801. Remote server 804 represents the machine(s) that collect and store helpful and useful data for use by other computers, such as computer 801. For example, in a hypothetical case where computer 801 is designed and programmed to provide a recommendation based on historical data, then this historical data may be provided to computer 801 from remote database 830 of remote server 804.

PUBLIC CLOUD 805 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 805 is performed by the computer hardware and/or software of cloud orchestration module 841. The computing resources provided by public cloud 805 are typically implemented by virtual computing environments that run on various computers making up the computers of host physical machine set 842, which is the universe of physical computers in and/or available to public cloud 805. The virtual computing environments (VCEs) typically take the form of virtual machines from virtual machine set 843 and/or containers from container set 844. It is understood that these VCEs may be stored as images and may be transferred among and between the various physical machine hosts, either as images or after instantiation of the VCE. Cloud orchestration module 841 manages the transfer and storage of images, deploys new instantiations of VCEs and manages active instantiations of VCE deployments. Gateway 840 is the collection of computer software, hardware, and firmware that allows public cloud 805 to communicate through WAN 802.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 806 is similar to public cloud 805, except that the computing resources are only available for use by a single enterprise. While private cloud 806 is depicted as being in communication with WAN 802, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 805 and private cloud 806 are both part of a larger hybrid cloud.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
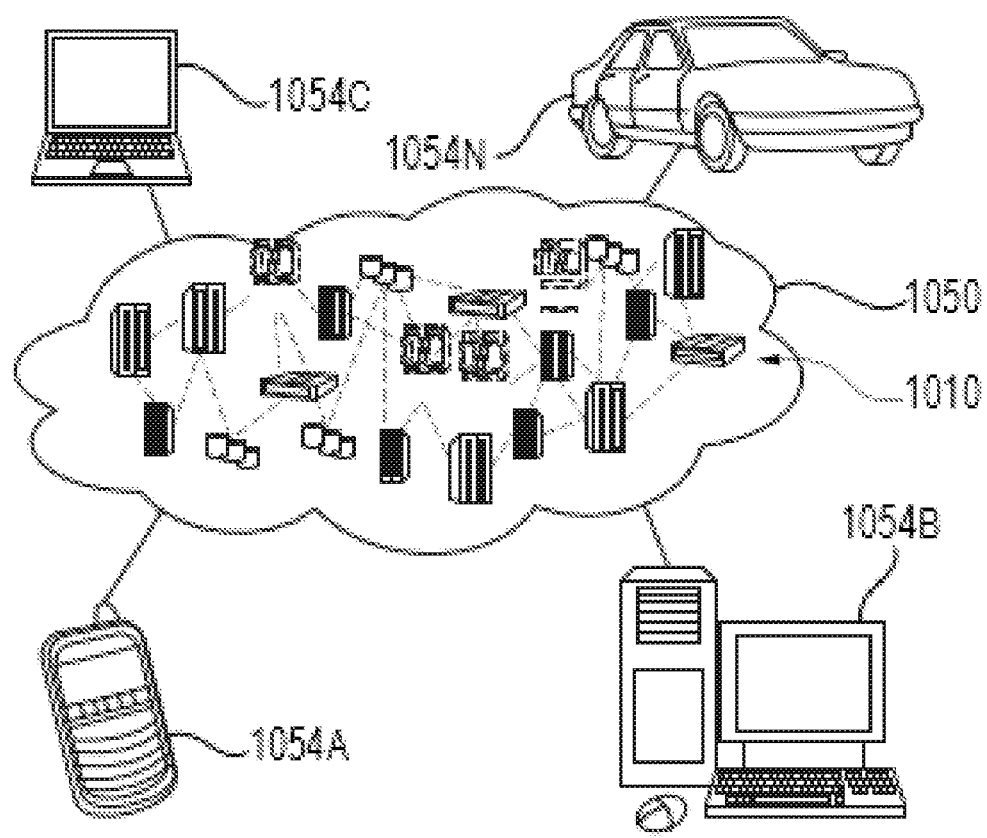
FIG. 8 depicts a cloud computing environment according to an embodiment of the present invention.

Referring now to FIG. 8, illustrative cloud computing environment 1050 is depicted. As shown, cloud computing environment 1050 includes one or more cloud computing nodes 1010 with which local computing devices used by cloud consumers, such as, for example, personal digital assistant (PDA) or cellular telephone 1054A, desktop computer 1054B, laptop computer 1054C, and/or automobile computer system 54N may communicate. Nodes 1010 may communicate with one another. They may be grouped (not shown) physically or virtually, in one or more networks, such as Private, Community, Public, or Hybrid clouds as described hereinabove, or a combination thereof. This allows cloud computing environment 1050 to offer infrastructure, platforms and/or software as services for which a cloud consumer does not need to maintain resources on a local computing device. It is understood that the types of computing devices 1054A-N shown in FIG. 8 are intended to be illustrative only and that computing nodes 1010 and cloud computing environment 1050 can communicate with any type of computerized device over any type of network and/or network addressable connection (e.g., using a web browser).

Figure 9:
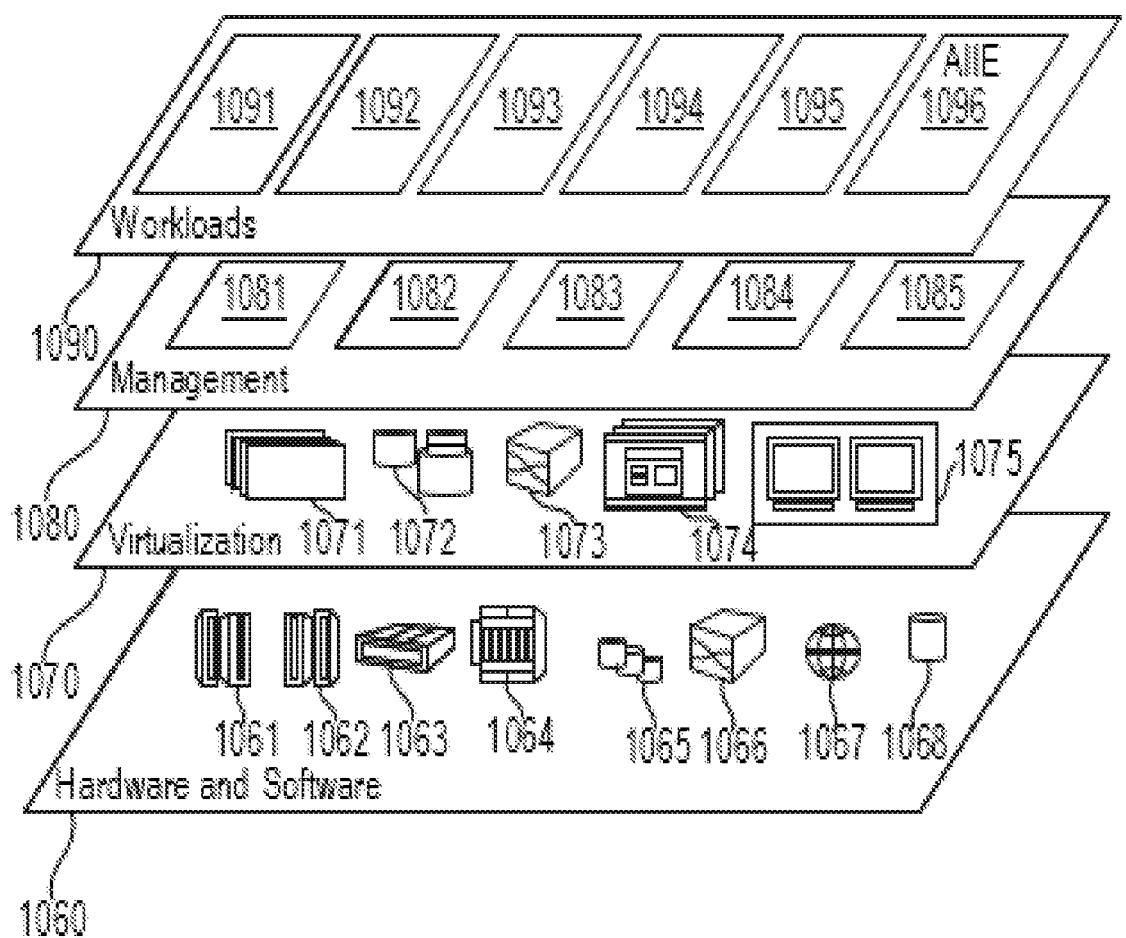
FIG. 9 depicts abstraction model layers according to an embodiment of the present invention.

Referring now to FIG. 9, a set of functional abstraction layers provided by cloud computing environment 1050 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 1060 includes hardware and software components. Examples of hardware components include: mainframes 1061; RISC (Reduced Instruction Set Computer) architecture based servers 1062; servers 1063; blade servers 1064; storage devices 1065; and networks and networking components 1066. In some embodiments, software components include network application server software 1067 and database software 1068.

Virtualization layer 1070 provides an abstraction layer from which the following examples of virtual entities may be provided: virtual servers 1071; virtual storage 1072; virtual networks 1073, including virtual private networks; virtual applications and operating systems 1074; and virtual clients 1075.

In one example, management layer 1080 may provide the functions described below. Resource provisioning 1081 provides dynamic procurement of computing resources and other resources that are utilized to perform tasks within the cloud computing environment. Metering and Pricing 1082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1083 provides access to the cloud computing environment for consumers and system administrators. Service level management 1084 provides cloud computing resource allocation and management such that required service levels are met. Service Level Agreement (SLA) planning and fulfillment 1085 provide pre-arrangement for, and procurement of, cloud computing resources for which a future requirement is anticipated in accordance with an SLA.

Workloads layer 1090 provides examples of functionality for which the cloud computing environment may be utilized. Examples of workloads and functions which may be provided from this layer include: mapping and navigation 1091; software development and lifecycle management 1092; virtual classroom education delivery 1093; data analytics processing 1094; transaction processing 1095; and a AI model inference engine (AIIE) 1096 that executes the main block of the artificial intelligence model in accordance with the present subject matter.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The invention claimed is:

1. A method for executing workloads in a distributed system using an artificial intelligence model, comprising:
   the distributed system comprising a set of first computer systems configured to connect to at least one second computer system of the distributed system,
   the artificial intelligence model configured to receive a specific input, process the specific input and provide a specific output, the artificial intelligence model further configured to be split into a set of one or more input blocks, an intermediate block and a set of one or more output blocks, such that the set of one or more input blocks receive the specific input and provides an intermediate output, the intermediate block receives as input the intermediate output and provides a second intermediate output, and the set of one or more output blocks receive as input the second intermediate output and provides said specific output;
   the method further comprising an orchestration method comprising:
     receiving a request to execute a workload using the artificial intelligence model, the workload comprising receiving the specific input;
     determining a current resource utilization status in the distributed system;
     using the current resource utilization status to define a deployment configuration of the artificial intelligence model, wherein the deployment configuration is defined by:
       the artificial intelligence model comprising a number and structure of input blocks, a number and structure of output blocks and the intermediate block of,
       a second computer system to execute the intermediate block, and
       one or more first computer systems to execute the number and structure of input blocks and the number and structure of output blocks;
     wherein defining the deployment configuration further comprises identifying whether an existing deployment configuration is present based on a previous deployment of the artificial intelligence model;
     based on the presence of the existing deployment configuration, determining whether the existing deployment configuration is valid;
     based on determining that the existing deployment configuration is valid, using the existing deployment configuration as the defined deployment configuration;
     based on determining that the existing deployment configuration is not valid, changing the existing deployment configuration and using the changed existing deployment configuration as the defined deployment configuration, wherein the changing further comprises changing at least one of the one or more first computer systems, the second computer system, the number and structure of the input blocks, the number and structure of the output blocks, and the intermediate block associated with the existing deployment configuration; and
   deploying the artificial intelligence model in accordance with the defined deployment configuration and executing the workload.

2. The method of claim 1, wherein before executing the orchestration method, the method comprises deploying the artificial intelligence model in accordance with an initial deployment configuration, wherein defining the deployment configuration comprises updating the initial deployment configuration, the updating comprising at least one of:
   re-splitting the artificial intelligence model;
   adding the one or more first computer systems to execute the number and structure of input blocks and the number and structure of output blocks;
   removing the one or more of the first computer systems of the initial deployment configuration to execute the number and structure of input blocks and the number and structure of output blocks; or
   selecting the at least one second computer system to execute the intermediate block.

3. The method of claim 1, wherein using the current resource utilization status to define the deployment configuration comprises:
   performing a capacity profiling of the one or more first computer systems and the second computer system to determine whether each of the one or more first computer systems and the at least one second computer system can execute one or more blocks of the artificial intelligence model;
   and defining the deployment configuration based on the capacity profiling.

4. The method of claim 1, wherein the current resource utilization status is defined by at least one of:
   utilization level of network resources of the distributed system;
   utilization level of resources of the one or more first computer systems; or
   utilization level of resources of the at least one second computer systems.

5. The method of claim 1, wherein the deployment configuration is defined further using a rule, the rule requiring at least one of:
   a maximum number of the one or more first computer systems to be used for deploying the number and structure of input blocks and the number and structure of output blocks;
   a maximum number of blocks of the artificial intelligence model;
   a fulfilment of a specific Quality of Service (QOS) requirement; or
   a desired energy-efficiency (EE).

6. The method of claim 1, wherein the distributed system includes a wireless communication system, wherein the one or more first computer systems are multi-access edge computing (MEC) nodes, and wherein the at least one second computer system is a cloud system.

7. The method of claim 1, further comprising:
executing the deployment of the artificial intelligence model by a broadcaster of the distributed system;
sending by the broadcaster an information to an orchestrator of the distributed system, such that the orchestrator triggers the execution of the workload upon receiving the information.

8. The method of claim 1, wherein the artificial intelligence model is a foundation model.

9. The method of claim 1, wherein the artificial intelligence model is a deep neural network or a transformer, wherein the number and structure of input blocks represents first network layers, the intermediate block represents middle network layers; and the number and structure of output blocks represents last network layers.

10. The method of claim 1, wherein the one or more first computer systems has an amount of processing resources which is smaller than other processing resources of the at least one second computer system.

11. The method of claim 1, wherein the workload involves at least one of: data analytics,
sensor measurement fusion from different sources, image analysis, or processing data streams destined to a cloud.

12. The method of claim 1, wherein the executing of the artificial intelligence model further comprises:
for each two consecutive blocks of the artificial intelligence model which are deployed on different computer systems, encoding using an encoding protocol the output of a first block of the two blocks, and sending the encoded output to a first computer system or to the at least one second computer system in order to be used as input for a second block of the two blocks.

13. The method of claim 12, wherein the encoding protocol comprises at least one of compression or encryption.

14. A computer program product comprising a computer-readable storage medium having computer-readable program code embodied therewith, the computer-readable program code configured to execute a method comprising:
receiving a request to execute a workload using an artificial intelligence model, the workload comprising receiving a specific input;
determining a current resource utilization status in a distributed system;
using the current resource utilization status to define a deployment configuration of the artificial intelligence model, wherein the deployment configuration is defined by:
a number and structure of input blocks, a number and structure of output blocks, and an intermediate block of the artificial intelligence model,
a second computer system to execute the intermediate block, and
one or more first computer systems to execute the number and structure of input blocks and the number and structure of output blocks;
wherein defining the deployment configuration further comprises identifying whether an existing deployment configuration is present based on a previous deployment of the artificial intelligence model;
based on the presence of the existing deployment configuration, determining whether the existing deployment configuration is valid;
based on determining that the existing deployment configuration is valid, using the existing deployment configuration as the defined deployment configuration;
based on determining that the existing deployment configuration is not valid, changing the existing deployment configuration and using the changed existing deployment configuration as the defined deployment configuration, wherein the changing further comprises changing at least one of the one or more first computer systems, the second computer system, the number and structure of the input blocks, the number and structure of the output blocks, and the intermediate block associated with the existing deployment configuration; and
deploying the artificial intelligence model in accordance with the defined deployment configuration and executing the workload.

15. A computer system for executing workloads in a distributed system using an artificial intelligence model, comprising:
the distributed system comprising a set of first computer systems which are configured to connect to at least one second computer system of the distributed system,
the artificial intelligence model configured to receive a specific input, process the specific input and provide a specific output, the artificial intelligence model being configured to be split into a set of one or more input blocks, an intermediate block and a set of one or more output blocks, such that the set of one or more input blocks receive the specific input and provides an intermediate output, the intermediate block receives as input the intermediate output and provides a second intermediate output, and the set of one or more output blocks receive as input the second intermediate output and provides said specific output;
the computer system comprising computer program instructions for:
receiving a request to execute a workload using the artificial intelligence model, the workload comprising receiving the specific input;
determining a current resource utilization status in the distributed system;
using the current resource utilization status to define a deployment configuration of the artificial intelligence model, wherein the deployment configuration is defined by:
a number and structure of input blocks, a number and structure of output blocks, and the intermediate block of the artificial intelligence model,
a second computer system to execute the intermediate block, and
one or more first computer systems to execute the number and structure of input blocks and the number and structure of output blocks;
wherein defining the deployment configuration further comprises identifying whether an existing deployment configuration is present based on a previous deployment of the artificial intelligence model;
based on the presence of the existing deployment configuration, determining whether the existing deployment configuration is valid;
based on determining that the existing deployment configuration is valid, using the existing deployment configuration as the defined deployment configuration;

based on determining that the existing deployment configuration is not valid, changing the existing deployment configuration and using the changed existing deployment configuration as the defined deployment configuration, wherein the changing further comprises changing at least one of the one or more first computer systems, the second computer system, the number and structure of the input blocks, the number and structure of the output blocks, and the intermediate block associated with the existing deployment configuration; and deploying the artificial intelligence model in accordance with the defined deployment configuration and executing the workload.

* * * * *